Sept. 8, 1959 A. J. STOCK 2,903,144
NON-SEGREGATING SYSTEM FOR HANDLING AND
FEEDING SOLID PARTICULATE MATERIAL
Filed Sept. 26, 1958 15 Sheets-Sheet 1
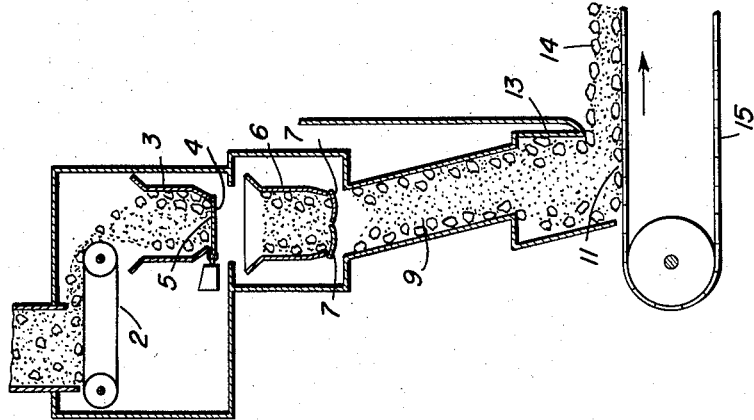
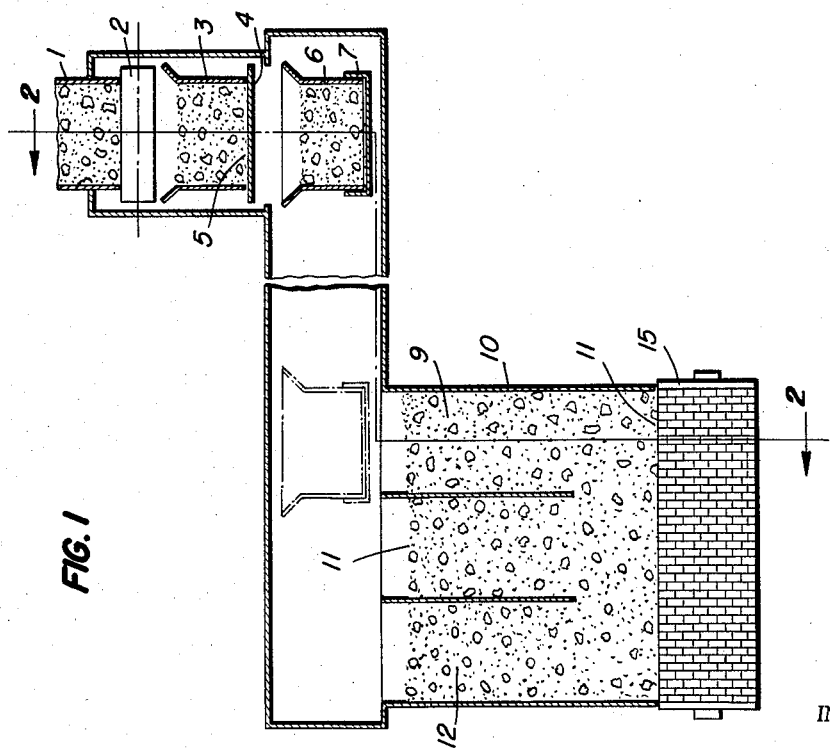
INVENTOR
Arthur J. Stock
BY *Stevens, Davis, Miller & Mosher*
ATTORNEYS INVENTOR
*Arthur J. Stock*

INVENTOR
Arthur J. Stock
ATTORNEYS

Sept. 8, 1959
A. J. STOCK
2,903,144
NON-SEGREGATING SYSTEM FOR HANDLING AND
FEEDING SOLID PARTICULATE MATERIAL
Filed Sept. 26, 1958
15 Sheets-Sheet 7

INVENTOR
Arthur J. Stock

BY *Stevens, Davis, Miller & Mosher*
ATTORNEYS

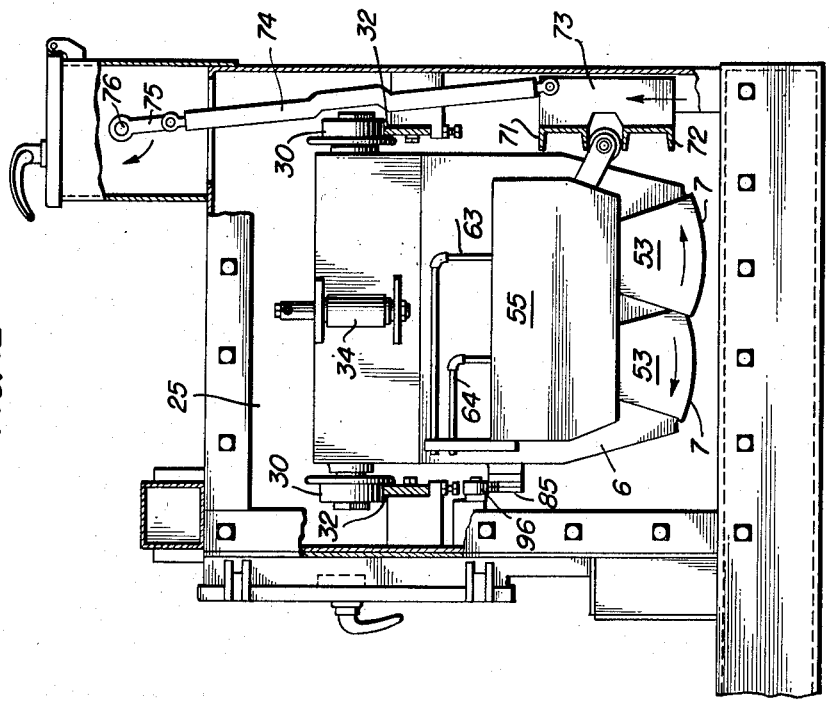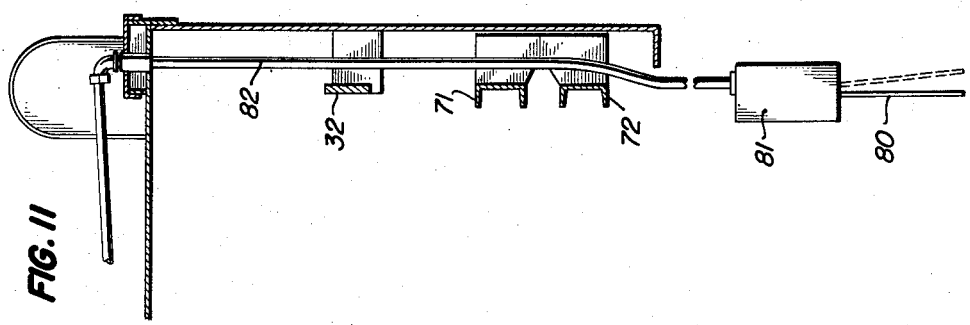

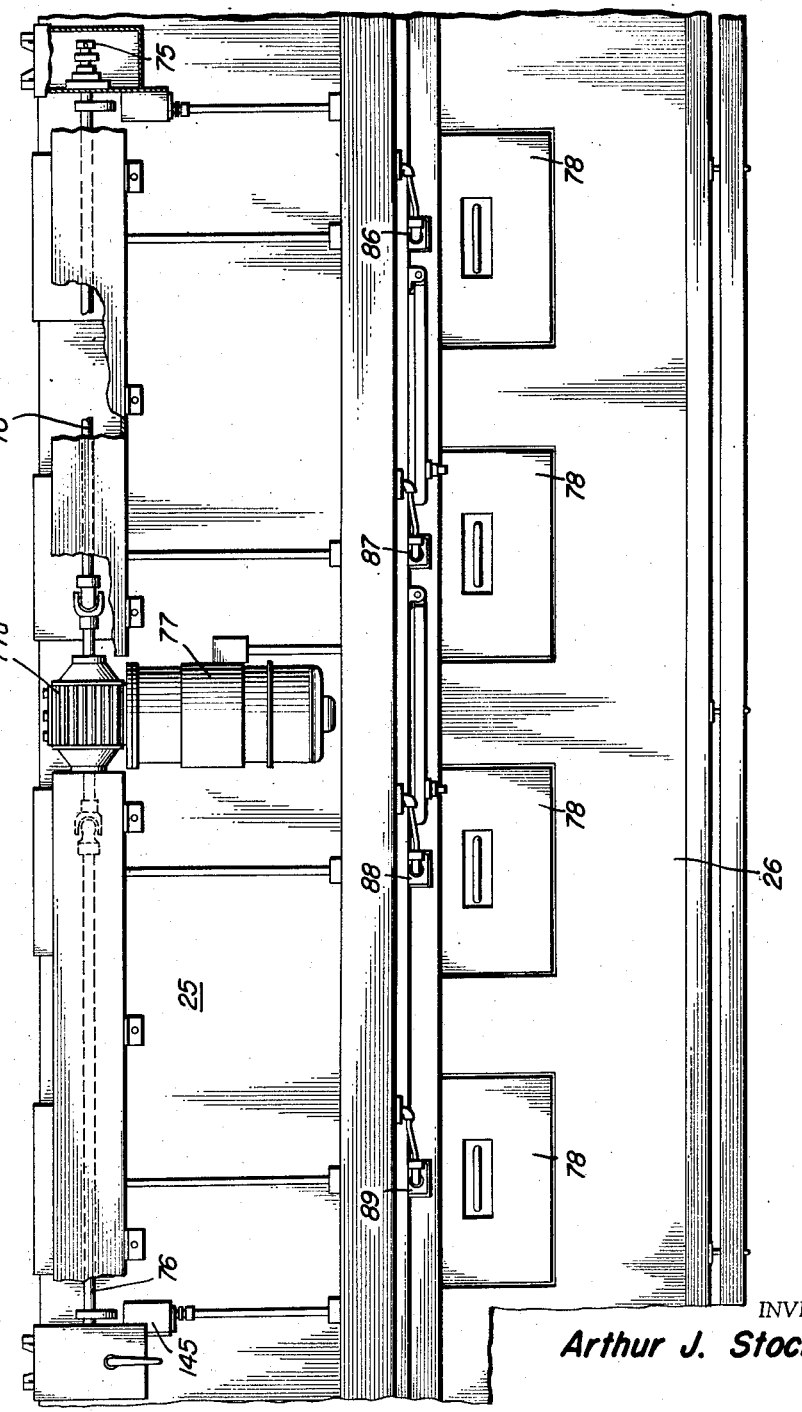

Sept. 8, 1959
A. J. STOCK
2,903,144
NON-SEGREGATING SYSTEM FOR HANDLING AND
FEEDING SOLID PARTICULATE MATERIAL
Filed Sept. 26, 1958
15 Sheets-Sheet 10
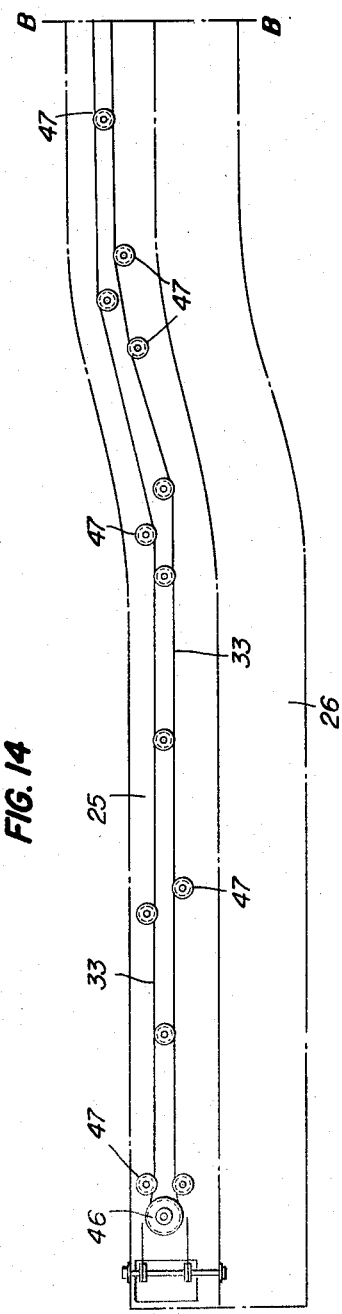
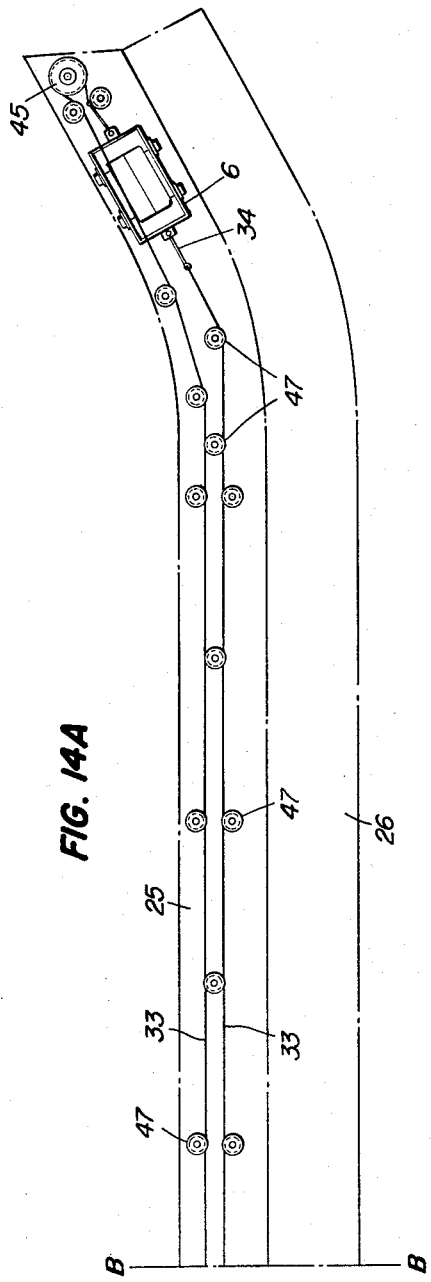
INVENTOR
*Arthur J. Stock*
BY *Stevens, Davis, Miller & Mosher*
ATTORNEYS

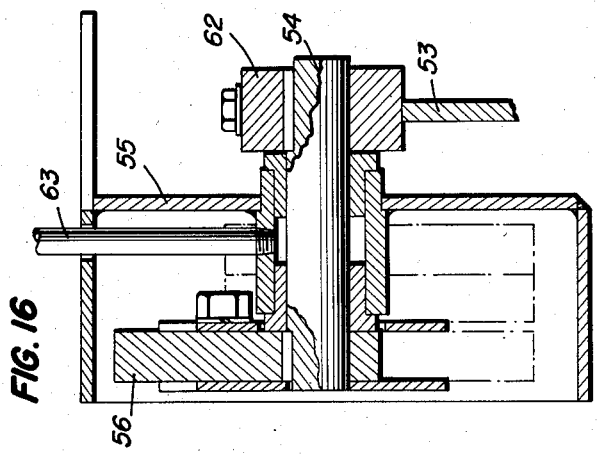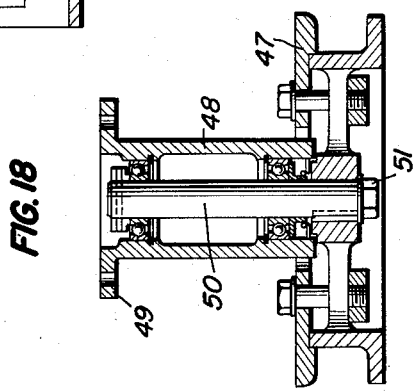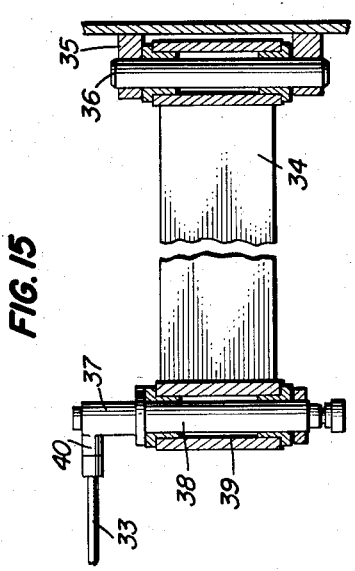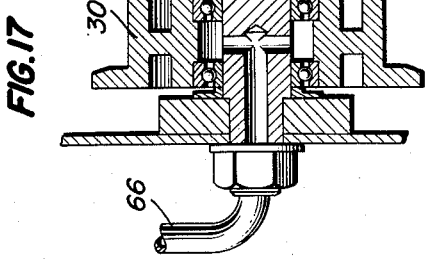
INVENTOR
Arthur J. Stock

Sept. 8, 1959 A. J. STOCK 2,903,144
NON-SEGREGATING SYSTEM FOR HANDLING AND
FEEDING SOLID PARTICULATE MATERIAL
Filed Sept. 26, 1958 15 Sheets-Sheet 12

INVENTOR
*Arthur J. Stock*

BY *Stevens, Davis, Miller & Mosher*
ATTORNEYS

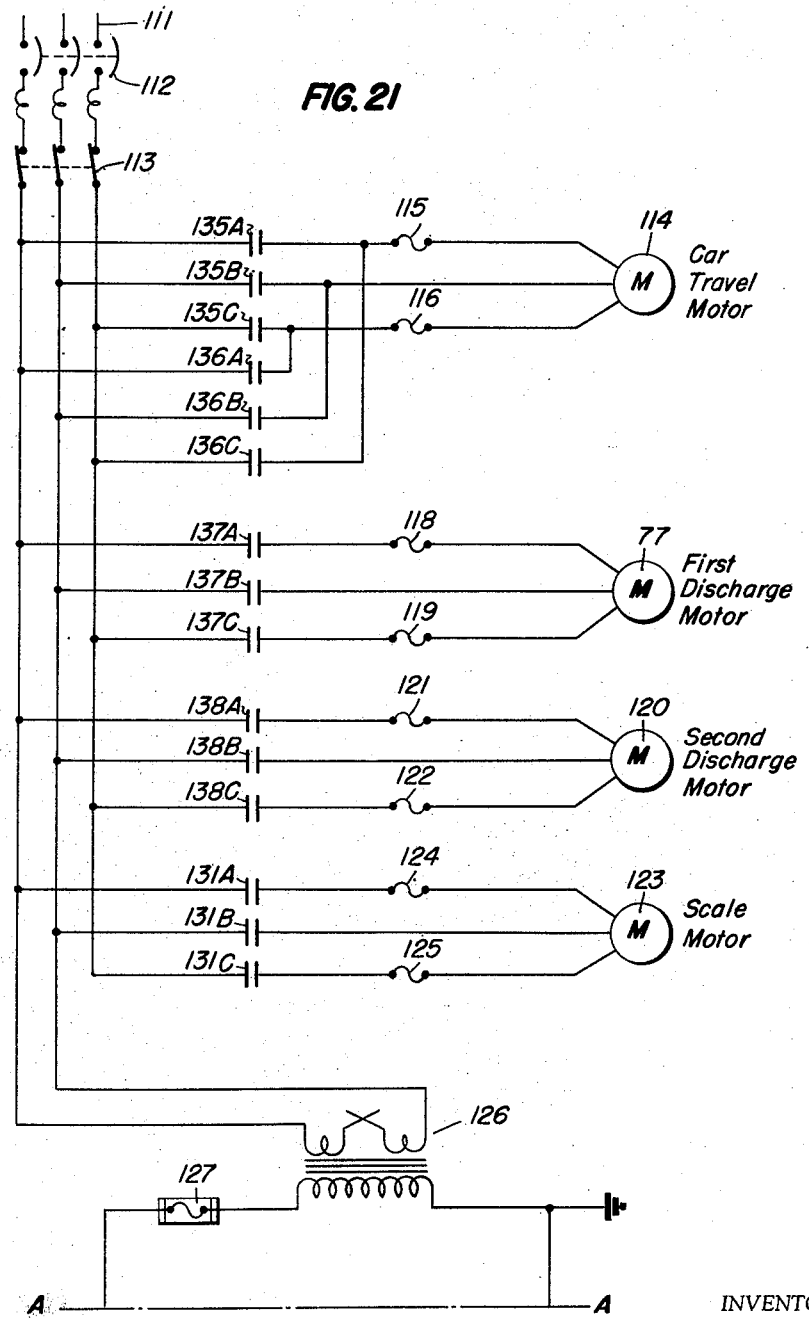

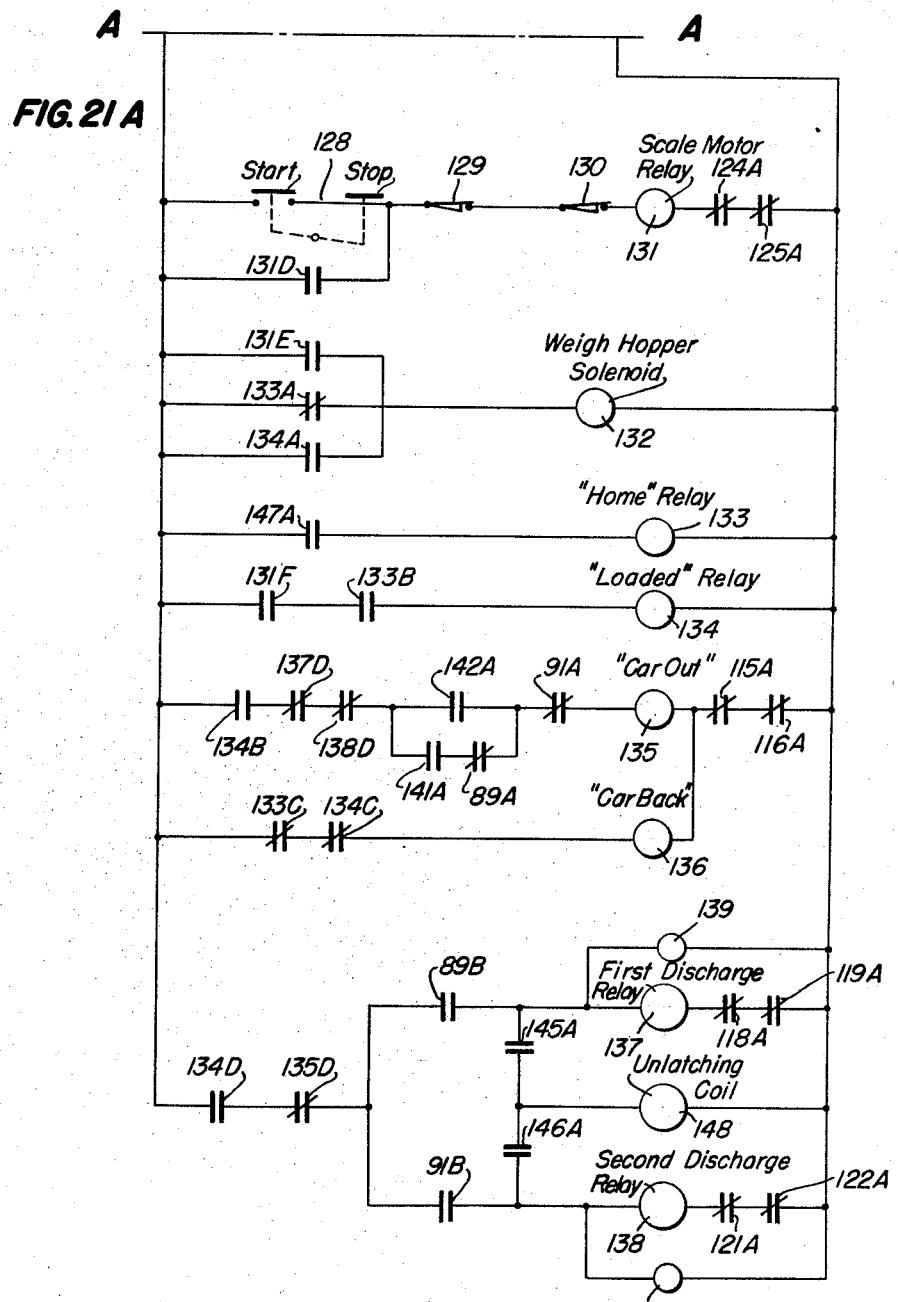

Sept. 8, 1959 A. J. STOCK 2,903,144
NON-SEGREGATING SYSTEM FOR HANDLING AND
FEEDING SOLID PARTICULATE MATERIAL
Filed Sept. 26, 1958 15 Sheets-Sheet 15
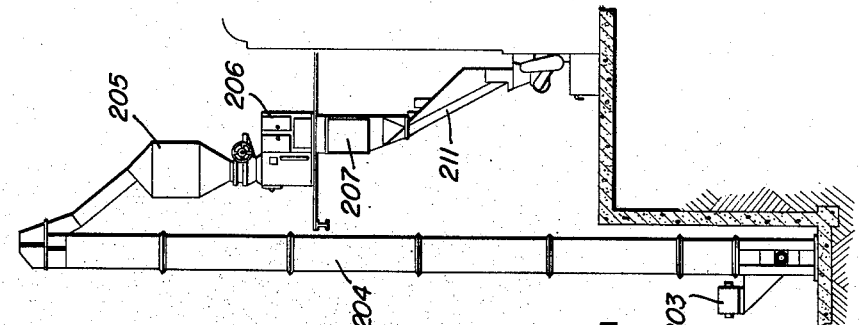
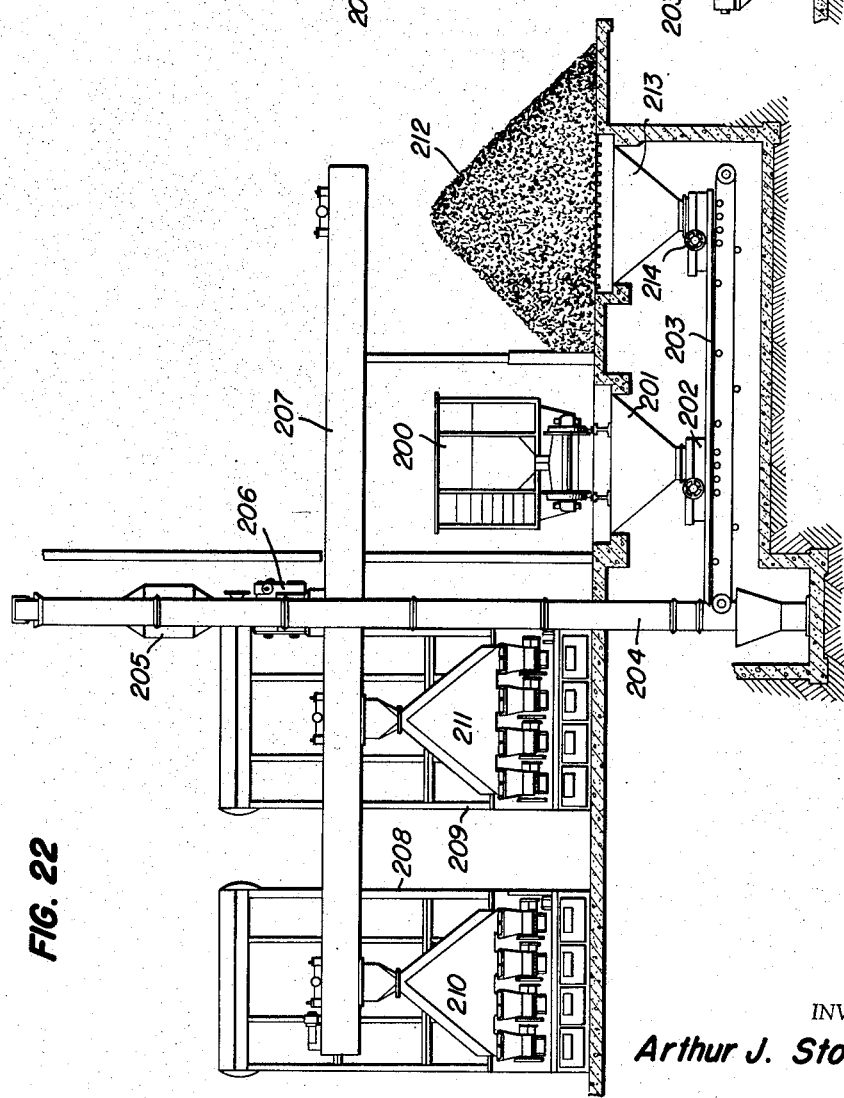
INVENTOR
Arthur J. Stock
BY *Stevens, Davis, Miller & Mosher*
ATTORNEYS

United States Patent Office 2,903,144
Patented Sept. 8, 1959

2,903,144

NON-SEGREGATING SYSTEM FOR HANDLING AND FEEDING SOLID PARTICULATE MATERIAL

Arthur J. Stock, Lakewood, Ohio

Application September 26, 1958, Serial No. 763,570

16 Claims. (Cl. 214—2)

This invention relates to a system for handling solid particulate material of mixed and different particle sizes, for example, coal, which system is especially designed for use in conveying quantities of solid material from a supply of the same to one or more points of use remote from the supply. A distinctive feature of this invention is that it is essentially non-segregating; i.e., it is designed to prevent or minimize the separation of the material into discrete masses of larger and smaller particles, which separation (or segregation) would tend to interfere with the consumption or use of this material at one or more of the various points of use.

Purely by way of description, the invention described herein will be set forth in terms of a coal-handling system for use in connection with a boiler having a stoker of the horizontally-traveling grate type; it should be understood that the present invention is equally applicable to the handling of other solid material of mixed particle sizes where it is desired to prevent or minimize the segregation of the larger particles from smaller particles in the course of handling the material.

When any solid material, such as coal, is supplied in the form of a random and dispersed mixture of larger and smaller particles, and when a stream of such material is directed or poured from the supply into a pile, the larger particles tend to gravitate to the outside of the pile leaving the innermost portion of the pile with a substantially larger concentration of the fines. For example, segregation can occur, and unhappily does occur, in many instances where proper regard is not taken for the orientation between various handling media such as conveyor belts, chutes, openings, etc., where the dimensions and relative dispositions of the various passageways and openings may be arranged in detrimental fashion from the standpoint of segregation.

Coal, as it is burned in boiler plants employing stokers having a horizontally-moving type of grate, is generally non-uniform as to size; that is, this coal is a random and dispersed mixture of pieces of coal of different sizes ranging from large lumps down to particle sizes which might be classified as dust. When the coal is burned in such a stoker-fired furnace, it is relatively important that the coarse particles do not become disadvantageously separated or segregated from the finer particles. In boiler plant usage the word "segregation" is used in a somewhat different sense from its more definitive dictionary meaning; actually, "segregation" refers only to that separation of coarser from finer particles which is detrimental to the operation of the furnace. For example, with reference to the horizontally moving grate of the furnace, segregation occurring in a vertical direction (through the thickness of the coal layer on the grate) is not considered disadvantageous. However, segregation across the grate, that is, in a direction transverse to the direction of movement, is considered detrimental to the operation of the furnace, and the word "segregation" as it is employed hereinafter refers to this particular type of separation of coarser particles from the smaller particles. The reasons for the above will be set forth hereinafter in greater detail.

The men working in the art to which this invention generally pertains have long since recognized the problem of segregation, and have proposed many "so-called" solutions for this problem, but none of these solutions has been adapted, or could be adapted, for use in conjunction with a distribution system feeding from a single source of supply to a plurality of separate points of use.

The present invention includes, generally, a supply or large mass of coal (which may be conveniently stored in a silo, for example) one or more furnaces or boilers comprising a plurality of points of use; a single weigh hopper associated with the supply of material for providing predetermined weighed quantities of coal; and a movable conveyor or car which is adapted to be moved automatically from the weigh hopper to one or more of the points of use.

In the present invention the length of the discharge opening for the weigh hopper (as well as the width of the feed belt which supplies coal to the weigh hopper), the length of the discharge opening in the movable receptacle or shuttle car, and the length of the individual compartments forming the stoker hoppers for the furnaces employed are all substantially equal. Also, the arrangement of the sequential feeding from the supply to the points of use is such that (1) the discharge from the feed belt is substantially parallel to the discharge opening in the weigh hopper, (2) the discharge opening in the weigh hopper will be parallel to the discharge opening of the shuttle car when the latter is positioned beneath the weigh hopper for receiving a load of coal therefrom, and (3) the discharge opening of the shuttle car will be substantially parallel to the aforementioned length of each of the individual compartments when the shuttle car is positioned directly above one of the compartments for the purpose of discharging coal into said compartment.

The present invention also includes devices responsive to the level of coal in each compartment for controlling the movement of the shuttle car from its "home" location (beneath the weigh hopper) to any given compartment which requires or "calls for" additional coal. The arrangement of the various elements of the present invention, as well as the electrical circuit employed in association therewith, provide a system which is completely automatic. Also, since the movement of the shuttle car is provided on tracks that are enclosed within a completely closed tunnel or housing, the entire system can be considered as dust tight.

Therefore, a principal object of the present invention is to provide a system for feeding coal from a source of supply to a boiler wherein the system is essentially "non-segregating" within the terms of reference employed herein.

Another important object of the present invention is to provide a system of the type referred to above wherein the coal which is fed from the source of supply to one or more points of use can be accurately tabulated and recorded, using a single weighing device, as to the consumption of coal at one or more points of use.

Another important object of the present invention is to provide a system of a type referred to above where the feeding of coal from the source of supply to one or more boilers is entirely automatic.

A still further object of this invention is to provide a system of the type referred to above wherein all of the interacting elements are enclosed thus resulting in a system which is dust tight.

Other and further objects and advantageous features of the present invention will hereinafter more fully appear in connection with the detailed description of the drawings in which:

Figure 1 is a semi-diagrammatic sectional view showing the relationship between a weigh hopper, a means for feeding the same, a compartmented hopper for a stoker having a horizontally moving grate, and a shuttle car which is movable from a position beneath the weigh hopper to a position directly above any one of the compartments of the stoker hopper;

Figure 2 is a semi-diagrammatic sectional view taken along section line 2—2 of Figure 1;

Figure 11 is a section view taken along section line 11—11 of Figure 4 showing the details of the paddle-type switch which is employed to sense the level of the coal in one of the compartments of the stoker hopper;

Figure 12 is a section taken along section line 12—12 of Figure 3 showing the shuttle car and details of the elements cooperating with the roller mechanism shown in Figures 9 and 10;

Figure 13 is a fragmentary plan view, on an enlarged scale and with some parts broken away, showing in greater detail those elements illustrated in the central portion of Figure 3;

Figures 14 and 14A show semi-diagrammatically in plan view, the left and right-hand portions, respectively, of the pulley and cable system employed for moving the shuttle car through its housing;

Figure 15 is a sectional view showing details of the means for connecting the cable to the shuttle car as it would appear taken along section line 15—15 of Figure 8;

Figure 16 is a sectional view taken along section line 16—16 of Figure 9 showing details of the lubricating system employed with gates for the shuttle car;

Figure 17 is a sectional view taken along section line 17—17 of Figure 7 showing further details of the lubricating system as employed in connection with one of the wheels of the shuttle car;

Figure 18 is a sectional view taken along section line 18—18 of Figure 9 showing details of one of the pulleys around which the cable passes;

Figure 3:
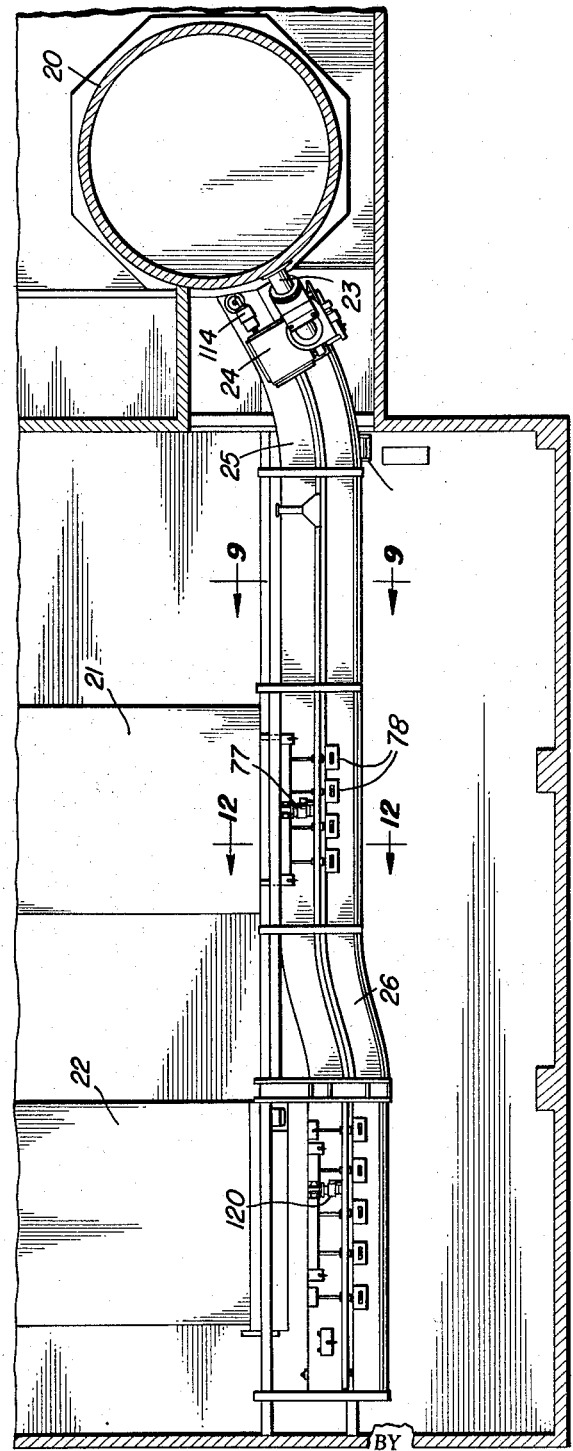
Figure 3 is a plan view of an over-all system embodying one form of the present invention.

Figures 21 and 21A, together, illustrate an electrical circuit diagram of the type which is employed with the system of the present invention;

Figure 22 is an elevation, partly in section, illustrating an over-all coal-handling system employing one embodiment of the present invention; and Figure 23 is a right-hand elevation of the left-hand portion of the structure illustrated in Figure 22.

Referring to the drawings in detail, Figures 1 and 2 show, in simplified and diagrammatic form, the features of the present invention wherein harmful segregation is prevented. For example, a continuous quantity of coal is directed from a supply of the same through a downspout 1 to the top of a feed belt 2. The upper flight of this belt 2 will move from left to right (as it appears in Figure 2) so as to discharge coal into a weigh hopper 3. The weigh hopper 3 has a movable gate or closure 4 for sealing off the longitudinal opening 5 at the bottom of the weigh hopper 3. When the gate 4 is opened, the weigh hopper 3 discharges a load of coal into the open top of a movable shuttle car 6 when the latter is properly positioned below the weigh hopper. The shuttle car has a gate, or more properly, a pair of gates 7, 7 for closing off the longitudinal opening 8 at the bottom of the shuttle car 6.

By means of a rail system, as will hereinafter more fully appear, the shuttle car 6 is movable from the position in solid lines in Figure 1 to the dotted line position (shown in this figure) over a compartment 9 of the stoker hopper 10. The shuttle car is also movable to corresponding positions over the other compartments 11 and 12. The bottom end of the stoker hopper 10 is provided with a longitudinal opening 11 which communicates with the horizontally traveling grate 15 of the stoker. The location of the lower end of the forward wall 13 of the stoker hopper 10 will determine the width of the layer of coal 14 traveling on the top of the moving grate 15.

In Figure 1 the corresponding internal horizontal dimensions of the downspout 1, the weigh hopper 3, the shuttle car 6 and the individual compartments 9, 11 and 12 are shown as being substantially equal. If the internal horizontal dimensions of the weigh hopper and shuttle car, respectively, shown in Figure 1 are considered the lengths of these members, and the corresponding horizontal dimensions shown in Figure 2 are considered as the widths, respectively, of these members, then it will be observed that the openings 5 and 8, respectively are of the same length and that their widths are slightly different. It should be further observed that the arrangement of the gate 4 with respect to the weigh hopper 3 and the arrangements of the gates 7 with respect to the shuttle car 6 is such that the stream of coal discharging from either of these two members is always parallel to the length of each member.

The arrangement of the downspout 1 relative to the feed belt 2 is such that the layer of coal deposited on the belt is substantially equal in width (across the belt) to the length of the weigh hopper 3. Thus, when the coal discharges from the right-hand end of the belt 2, as it appears in Figure 2, into the weigh hopper 3, the larger particles of coal may tend to go to the right and to the left of the vertical center line through the weigh hopper 3. In view of the fact that the width of this stream of coal is equal to the length of the weigh hopper 3 (as it appears in Figure 1), there will be no segregation in the longitudinal direction. Furthermore, when the coal discharges from the weigh hopper 3 into the shuttle car 6 the stream of coal leaving the weigh hopper will be equal in width to the length of the shuttle car and, thus, there will be no segregation in the transverse direction, i.e., across the length of the shuttle car 6. However, the larger particles of coal may tend to become more concentrated against the forward and rear walls of the shuttle car, or, stated differently, there may be some segregation on opposite sides of the vertical center line of the shuttle car, as it appears in Figure 2.

When the shuttle car is discharging into compartment 9, for example, the same situation with regard to segregation prevails; that is, the width of the stream issuing from the shuttle car 6 will be equal to the length of the compartment 9, such that no segregation occurs in the longitudinal direction, i.e., along the length of the compartment 9. Again, segregation may occur with respect to the forward and rear walls of the stoker hopper 10, but as will presently appear, this type of segregation is not harmful to the operation of the boiler.

For example, as shown in Figure 2, there may be a relatively greater concentration of the larger particles of coal at the top and bottom, respectively, of the layer 14 on the grate 15. However, with respect to the direction across to the grate, that is, in the direction appearing in Figure 1, the distribution of the coal in this instance is uniform. Since the burning of the layer of coal 14 on the grate 15 is generally effected by the upward passage of an oxygen-containing gas (air) through the grate and through the layer of coal, and, since the distribution of the coal is uniform across the grate, the resistance to the passage of the gas through the layer of coal will be uniform across the grate. Therefore, with respect to the direction across to the grate, the coal layer will burn at a uniform rate, and thus, the grate 15 may be advanced at such a rate that the material falling off the far end (not shown) will be completely burned.

It is important in the operation of the system of the present invention that the opening at the bottom of the weigh hopper 3 be equal in length to the opening at the bottom of the shuttle car 6 and, further, that these two openings should be parallel to one another when the weigh hopper is discharging its load into the shuttle car. Secondly, it is important that the length of the opening at the bottom of the shuttle car 6 be equal to the corresponding length (the distance shown in Figure 1) of each of the compartments 9, 11 or 12 into which the shuttle car 6 discharges its load. Furthermore, the discharge opening of the shuttle car 6, when the same is discharging into one of the compartments 9, 11 or 12, should be parallel to that distance of compartment which is equal to the length of the opening.

It should be pointed out, however, that the shuttle car 6, traveling from its position beneath the weigh hopper to a position over one or more of the compartments 9, 11, or 12, as shown in Figure 1, need not necessarily travel in a straight line; the path taken by the weigh hopper may be curved, or it may be upwardly or downwardly. The only conditions which must be met are (a) the above described relationship between the weigh hopper and the shuttle car when the weigh hopper is discharging its load into the weigh hopper, and (b) the relationship described above between the shuttle car and the respective compartment of the stoker hopper when the car is positioned for discharging its load into this compartment. In other words, the compartments of a given stoker hopper need not necessarily be parallel to the discharge opening of the weigh hopper, and, where more than one stoker hopper is employed, as in the case of two or more boilers, the individual stoker hoppers need not necessarily be parallel to one another.

Figure 4:
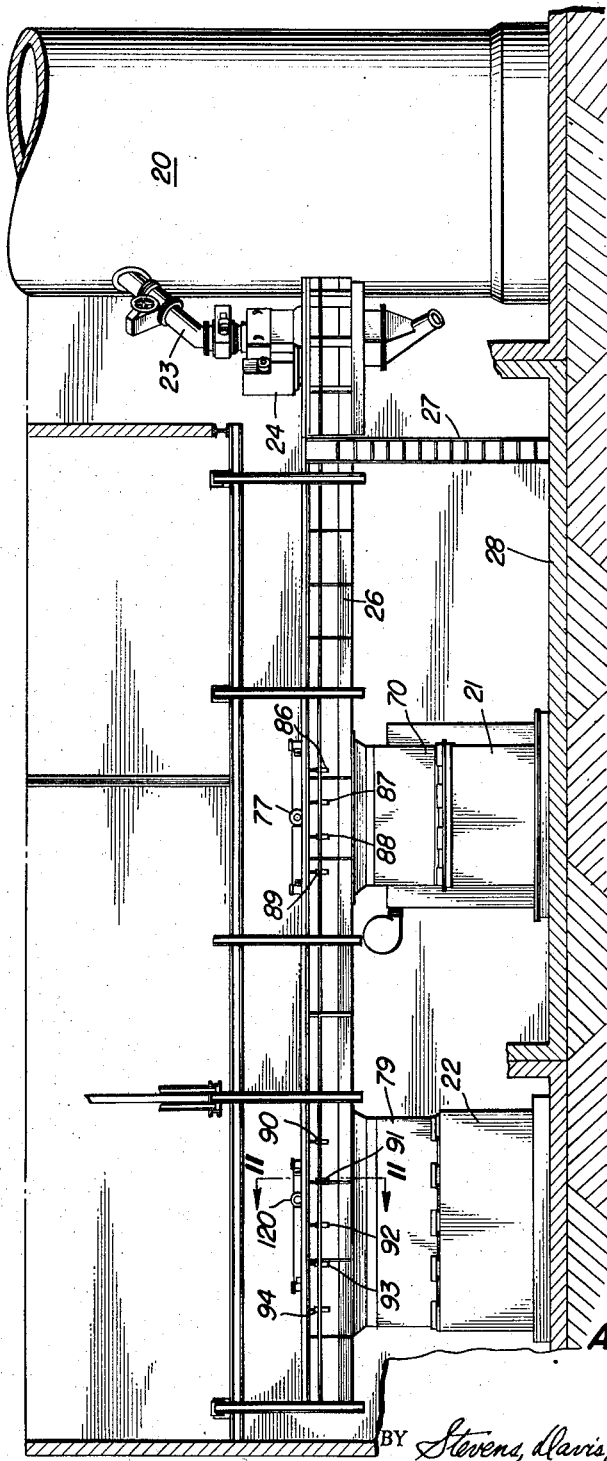
Figure 4 is a front view of the structure shown in Figure 3.

Figure 3 shows, in plan view, an arrangement for supplying coal from a coal silo 20 to two boilers, 21 and 22. A downspout 23 leads from the silo 20 to a casing 24 in which the weigh hopper, and associated mechanism, is located. An enclosed housing 25 extends from its right-hand end adjacent the silo 20 to the left, passing in front of the boilers 21 and 22. The shuttle car (which is not shown in this figure) is adapted to travel within this housing 25 from a position below the casing 24 of the weigh hopper to any one of the several hopper compartments associated with the two boilers 21 and 22. A suitable catwalk 26 is provided forward of the housing 25, and parallel therewith, to permit observation and maintenance of the operations of the system of the present invention. Figure 4 shows the same elements of Figure 3 in front elevation. A ladder 27 permits access to the catwalk 26 from the floor 28.

Figure 5:
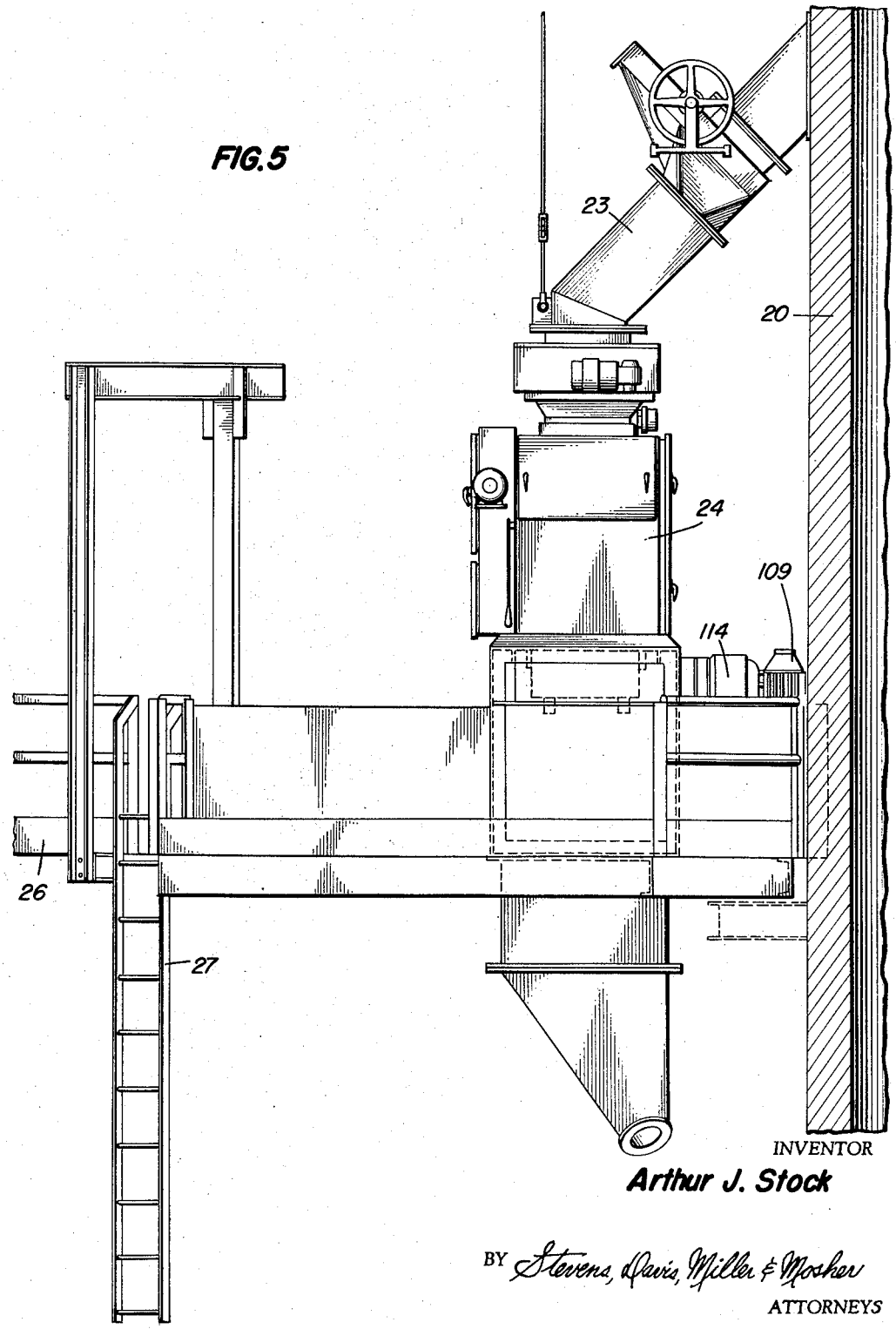
Figure 5 is a front elevation on an enlarged scale of the right-hand portion of Figure 4, showing that portion of the system which is associated with the supply.

Figure 5 shows, on an enlarged scale, the details of the right-hand end of the system shown in Figure 4.

Figure 6:
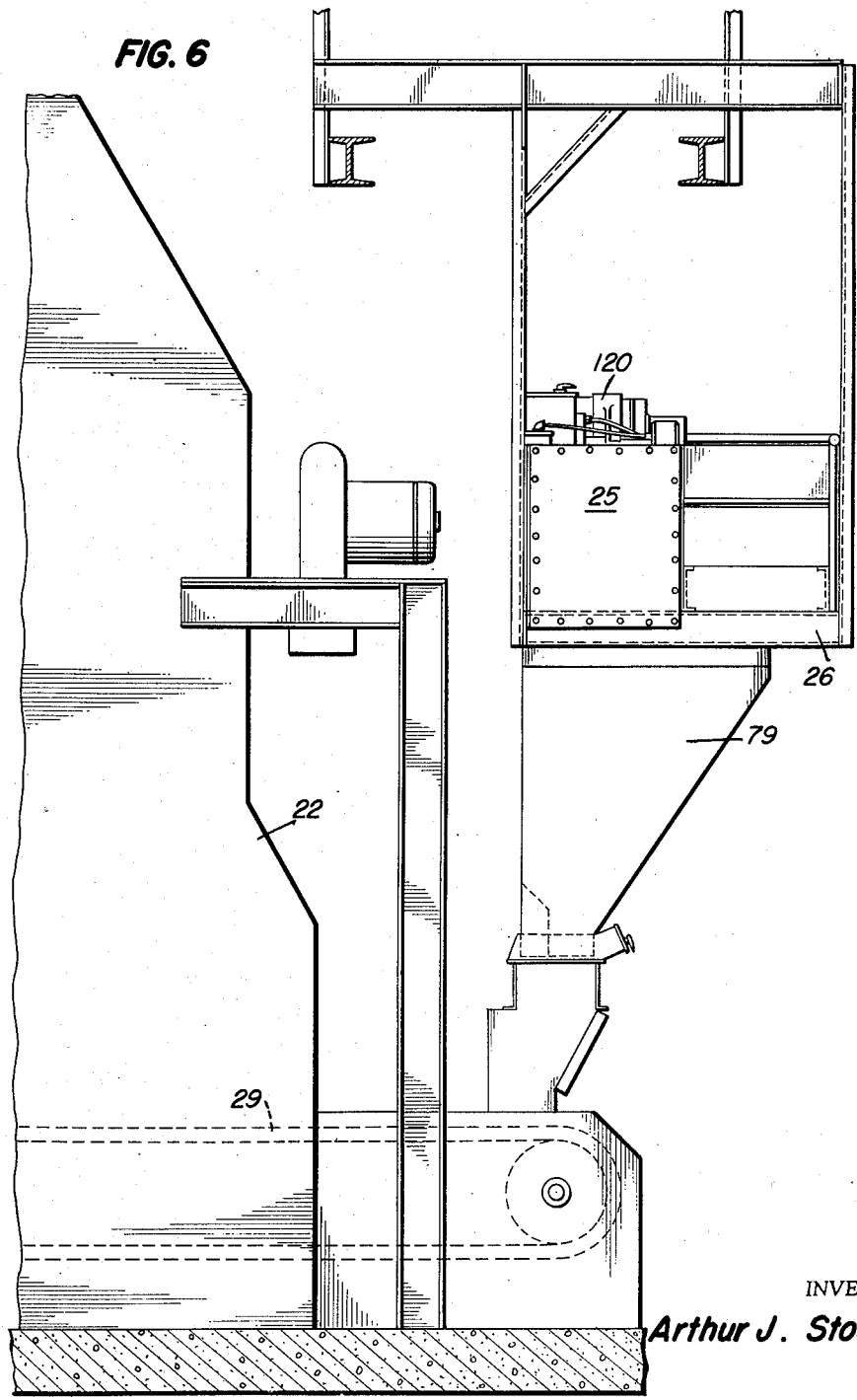
Figure 6 is a left-hand elevation taken with respect to Figures 3 and 4 showing that portion of the system which is associated with the inlet to the left-hand boiler.

Figure 6 is a left-hand elevation, on an enlarged scale, of the structure shown in Figures 3 and 4, and showing in dotted lines, the horizontally traveling grate 29 of the boiler 22.

Figure 7:
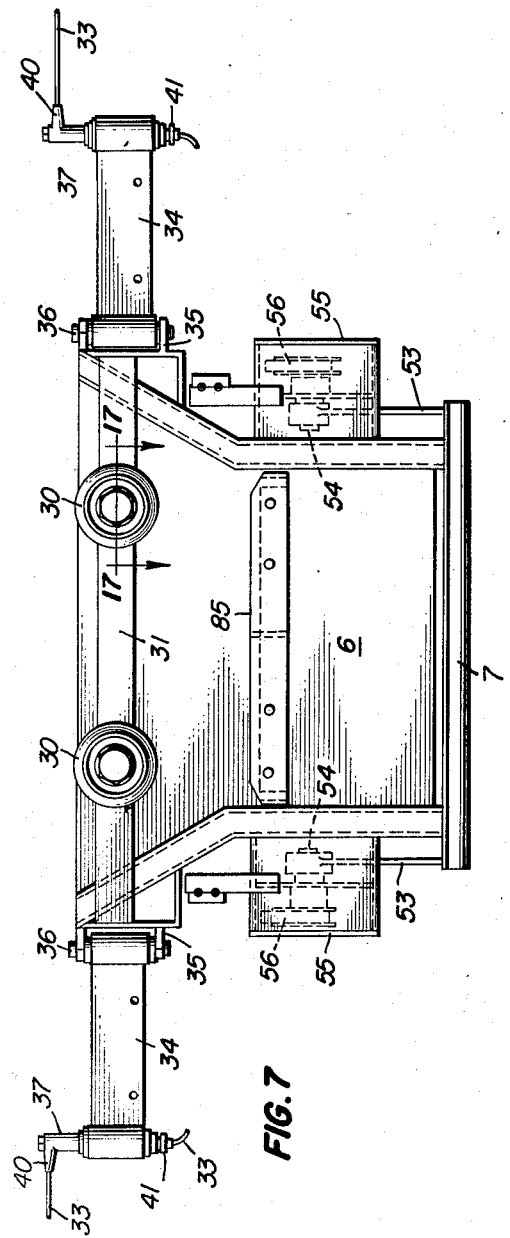
Figure 7 is a front elevation of the shuttle car of the present invention.
Figure 8:
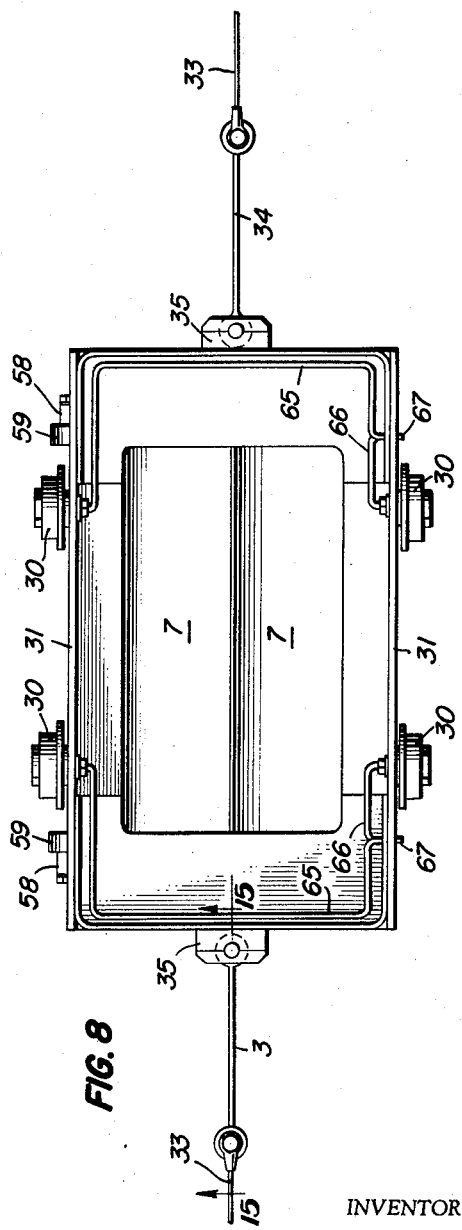
Figure 8 is a plan view of the shuttle car shown in Figure 7.
Figure 9:
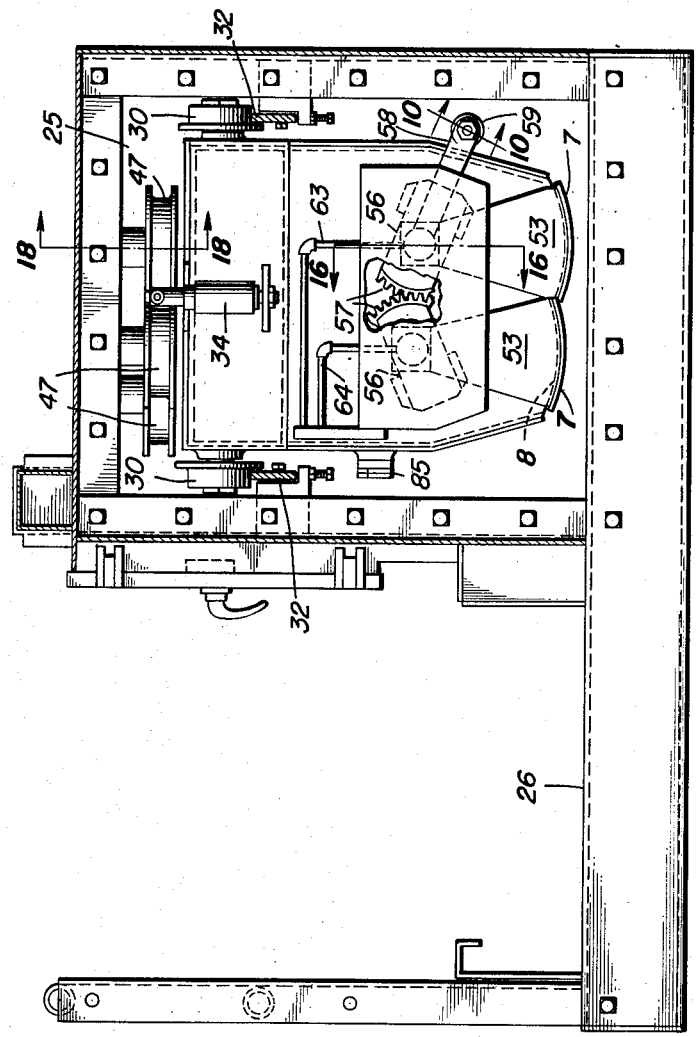
Figure 9 is a right side elevation, with some parts in section and with some parts broken away, taken along section line 9—9 of Figure 3, and showing in particular the relationship between the shuttle car, the housing which encloses the same, and the catwalk formed by the adjacent supporting structure.

In Figures 7, 8, 9 and 12, there is shown in detail the shuttle car 6 which travels back and forth within the housing 25. As will be evident from a consideration of these figures, the cross-sectional shape of the shuttle car is essentially rectangular; however, the shorter sides of the shuttle car are flared outwardly at the upper ends for the purpose of preventing spillage when the weigh hopper is discharging a load of coal into this shuttle car. Also, at the lower end of the shuttle car the long sides are tapered somewhat inwardly adjacent the gates 7 to facilitate the discharge of material through the longitudinal opening 8. Four wheels 30, 30 etc. are suitably journaled in a pair of longitudinal plates 31, 31 which are secured to the long sides of the shuttle car 6. As shown in Figures 9 and 12, these wheels roll along a pair of tracks 32, 32 located within the housing on the opposite sides thereof.

For the purpose of moving the shuttle car 6 back and forth through the housing 25, there is provided a cable 33 (see also Figures 14, 14A and 15) which passes around various pulleys within the housing and which is attached at its ends to the opposite ends of the shuttle car by means of the pivotal links 34, 34. Each link 34 is pivotally attached to one end of the shuttle car by means of a bracket 35 associated with the shuttle car and a pin 36 which passes through corresponding aligned holes in the bracket 35 and the link 34. The other end of each of these pivotal links 34 is pivotally attached to the cable by means of a cable anchor 37 which has a vertical shank portion 38 journaled in a hole 39 in one end of the link. The upper end of each cable anchor is provided with a horizontally projecting portion 40 which is suitably grooved in its upper surface and which communicates with a vertical bore within the shank portion 38 so as to permit the insertion of the end of the cable 33 into the cable anchor 37. A collet 41 is adapted to be screwed into the tapered and threaded lower opening of the internal bore of the shank portion 38 so as to secure the cable 33 within the cable anchor 37. The lower end of the cable 33 may project downwardly and outwardly through the collet 41, as shown in Figure 7, and if necessary, excess cable may be looped around the link 34.

Referring now particularly to Figures 14 and 14A, the cable 33, at one end of the housing 25, passes around a drive pulley 45 which serves to move the cable and cause the shuttle car 6 to go back and forth within the housing. At the other end of the housnig, the cable passes around a tail pulley 46 which is suitably mounted in a horizontally slidable support, said support being counterweighted in a substantially conventional manner to insure continuous tension on the cable 33. A plurality of intermediate pulleys, all of which are designated by the reference numeral 47, are judiciously dispersed throughout the housing at various locations for the purpose of guiding the cable and the car through the housing and, in particular, around the curves in said housing. It should be noted that the projecting portion 40 of the cable anchor 37 is located at an elevation above the upper edge of the shuttle car 6, such that, when the car is passing through one of the three curves shown in Figures 14 and 14A, the corresponding movement of the cable around the adjacent pulleys will be free of any obstruction that might otherwise be caused by the shuttle car.

The individual pulleys 47 are spaced downwardly from the roof of the housing 25 and may be conveniently supported therefrom in any conventional manner, for example, as shown in Figure 18; in this figure, a hollow cylindrical support 48 is provided with a circular flange 49 at the upper end thereof which will permit bolting of the same to the roof of the housing 25. A pulley shaft 50 is suitably journaled within the hollow bore of the cylindrical support 48 and may be provided with suitable thrust bearings, if desired. The pulley 47 is simply keyed to the lower end of the pulley shaft 50 and held in position by means of nut 51.

Figure 10:
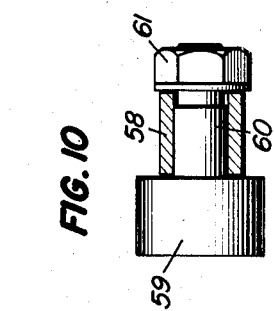
Figure 10 is a partial section view taken along section line 10—10 of Figure 9 showing details of the roller mechanism which is employed to operate the gates at the bottom of the shuttle car.

The gates 7 which, as indicated above, provide the longitudinal opening 8 at the bottom of the shuttle car 6, are each arcuate in transverse cross section and extend longitudinally beyond the side edges of the shuttle car 6 as shown in Figure 7. Each gate 7 is supported at its opposite ends by a pair of sector-shaped plates 53, 53. The upper ends of these sector-shaped plates 53 are pivotally mounted on shafts 54, 54 located within the sub-housings 55, 55. Also, as best shown in Figure 9, a rectangular plate 56 is keyed to each of the shafts 54. The inner adjacent ends of opposing pairs of flat plates 56 are provided with segmental gear portions 57 which intermesh with one another, the result of which is to permit simultaneous movement of the gates 7 in opposite directions. These flat plates 56 are counterweighted so as to urge the gates 7 into a normally closed condtion. A roller arm 58 is attached to the hub portion 62 (see Figure 16 also) of each of the two rear sector plates 53 so as to project rearwardly and slightly downwardly with respect to the shuttle car 6. As best shown in Figure 10, each roller arm 58 carries a roller 59 mounted on one end of a pin 60, the other end of which is secured by a nut 61.

As shown in Figure 9, and in further detail in Figure 16, hollow pipes 63 and 64 are provided to permit the introduction of lubricant to the elements associated with the shafts 54.

As shown in Figure 8, and in further detail in Figure 17, hollow pipes 65, 65 and 66, 66 wtih their respective common external openings 67, 67 permit the introduction of lubricant into the interior of the wheels 30.

Figure 12 represents the relative positions of the various elements when the shuttle car 6 is located over the stoker hopper 70 for the boiler 21. In this figure the roller 59 for each roller arm 58 will be positioned between a pair of horizontally extending rails 71 and 72 which are attached to a vertically reciprocable supporting element 73. An actuating arm 74 is pivotally attached at its lower end to the supporting element 73 and at its upper end is pivotally attached to a rotatable arm 75. Since the rails 71 and 72 extend for the full length of the stoker hopper, one of each of the elements 73, 74 and 75 will be located adjacent each end of the rails 71 and 72.

Also it might be pointed out, although the same is not illustrated in the drawings, that the space between the rails 71 and 72 at the extreme ends thereof is somewhat greater than that shown in Figure 12 so as to permit the simple entry of the roller 59 into this space when the shuttle car is passing in either direction. Each rotatable arm 75 is keyed to an opposite end of a rotatable shaft 76 (see now Figure 13) the central portion of which is interrupted for the interposition of a gate-operating motor 77 and interconnecting gear drive 77a. The means for actuating the motor 77 will be explained in further detail in connection with the description of the electrical circuit for operating the entire system.

Figure 13 shows that portion of the catwalk, tunnel and associated structure which would be disposed over the stoker hopper 70 for the boiler 21. The catwalk 26 is shown as having four removable cover plates 78, 78, etc., each of which will permit access to one of the compartments of the stoker hopper 70 for the purpose of inspection or for manual filling of the compartments (in the event that such type of operation is desired or in the event of power failure). Thus, it should be evident that the stoker hopper 70 associated with the boiler 21 is provided with three vertical plates (not shown) which divide the stoker hopper into four separate vertical compartments each similar to the ones illustrated in Figure 1. In the case of stoker hopper 70, each of the compartments, in a direction parallel to the boiler front, will have a dimension equal to the length of the shuttle car for the reasons previously set forth. Also, each of the compartments of the stoker hopper 70 (as will also be the case with respect to the stoker hopper 79 of the boiler 22) will be provided with a level-sensing device such as is illustrated in Figure 11.

The device shown in Figure 11 is a paddle-type control switch wherein the paddle 80 is normally urged into the solid line position shown in this figure. When the paddle 80 is in this solid line position, the switch 81 will be closed and a signal will be transferred through the electrical wiring in the conduit 82 to the electrical control circuit. As shown in this figure, the paddle-type alarm would be located adjacent one of the walls of the stoker hopper such that, as the coal is piled up in the hopper to a sufficient level, the coal would cause the paddle element 80 to be deflected to the dotted line position, thus opening the switch 81.

As shown in Figures 7, 9 and 12, the shuttle car 6 is provided with a cam plate 85 at one side of the car. As the car passes back and forth within the housing 25, the cam plate 85 will contact a series of rollers which are associated with electrical switches, and depending upon the condition of the coal level control switch 81 in any given compartment of any stoker hopper, the shuttle car will be caused to stop directly over the corresponding compartment for the purpose of discharging a load of coal into this compartment. The external connections for the switches (for stopping the shuttle car) are shown in Figure 4 as elements 86, 87, 88, 89, 90, 91, 92, 93 and 94. Since these positions correspond generally to the location of the compartments in the stoker hopper, it may be assumed, as indicated heretofore, that stoker hopper 70 is composed of four compartments and that stoker hopper 79 includes five separate compartments.

Figure 19:
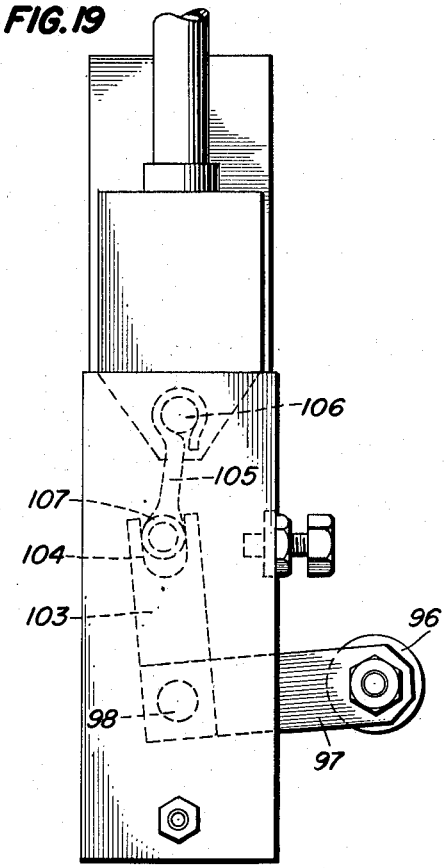
Figure 19 is a front elevation of one of the switches employed for stopping movement of the shuttle car over one of the compartments of the stoker hopper.
Figure 20:
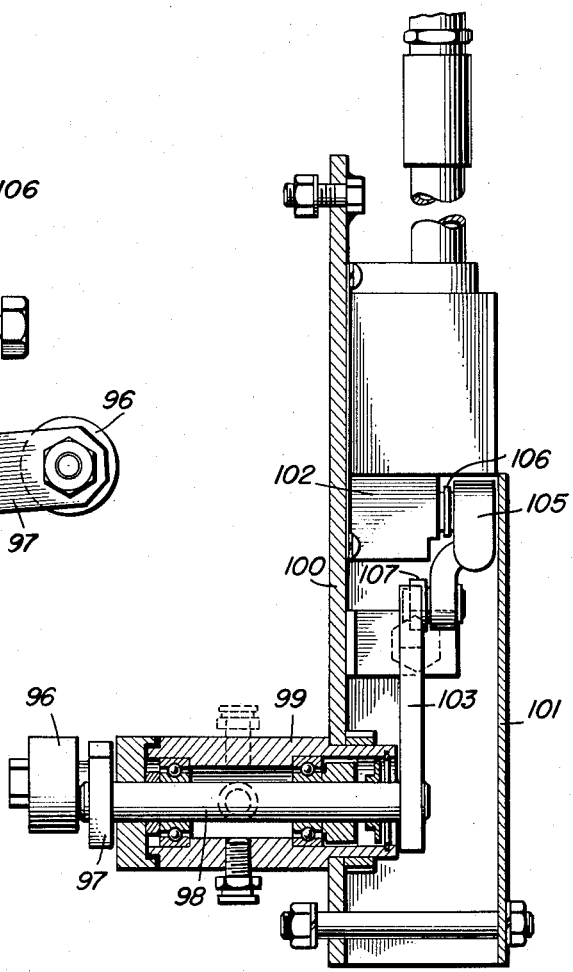
Figure 20 is a left-hand elevation, partly in section, of the mechanism shown in Figure 19.

The details of one of those car stopping switches are shown in Figures 19 and 20. Figure 19 represents the position of the switch viewed on an enlarged scale and taken from the same direction as Figure 4, assuming that the associated tunnel structure has been removed. The portion of this switch which comes into direct contact with the cam plate 85 is the roller element 96 which is shown in such a contacting position in Figure 12. Roller 96 is rotatably mounted on one end of an arm 97 which is keyed at its other end to a shaft 98. Shaft 98 is suitably enclosed in a journal box 99 which is secured to the forward wall 100 of the housing 25. Both the shaft 98 and the right-hand end of journal box 99 (as they appear in Figure 20) pass externally of the housing 25 into a small vertical casing 101 which encloses the electrical switch 102. A rocker arm 103, having a U-shaped opening 104 at its upper end, is keyed at its lower end to the right-hand end of the shaft 98.

The electrical switch 102 (the details of which form no part of this invention and hence are not shown) is provided with an actuating arm 105 which is keyed at its upper end to a shaft 106 which operates the switch 102. The lower end of the actuating arm 105 is provided at its lower end with a roller 107 which is received within the U-shaped opening 104 of the rocker arm 103. The arrangement of the elements in Figures 19 and 20 is such that when the roller 96 is contacted by the cam plate 85 on the shuttle car 6, as the same passes the particular car-stopping switch, it will cause the roller to be lifted. Thus, with particular reference to Figure 19, lifting of the roller 96 will cause a counterclockwise movement of the arm 97 and corresponding counterclockwise movement of the rocker arm 103 about the axis passing through the shaft 98. Counterclockwise movement of the rocker arm 103 will cause a clockwise movement of the actuating arm 105 about the axis through the center of the shaft 106 for the switch 102, and this clockwise movement of the shaft 106 will be sufficient to actuate the switch 102.

As will appear hereinafter, the arrangement of the structure shown in Figures 19 and 20, with regard to a given compartment of any particular stoker hopper, is such that if the corresponding coal-level sensing switch 81 for that particular associated compartment is energized, the shuttle car will stop automatically at that particular compartment. Otherwise, with regard to any given stoker compartment, if the corresponding switch 81 is not actuated, then the movement of the shuttle car 6 past the particular car stopping switch associated with that compartment will have no effect as to the stopping of the shuttle car.

Referring to Figures 21 and 21A which together constitute a simplified electrical circuit, these figures show the necessary electrical components for the operation of the shuttle car in connection with a single weigh hopper and two separate discharge stations. As has been considered heretofore, the stoker hopper 70 for the boiler 21 has four compartments and the stoker hopper 79 for the boiler 22 has five compartments, thus making a total of nine separate compartments or nine separate stations at which the shuttle car 6 may be caused to stop. Therefore, although the showing in Figures 21 and 21A has been simplified to the extent that only two such discharge stations have been shown, it should be understood that the illustrated electrical circuit diagram would have to be amplified in order to include the necessary circuit components for all nine discharge stations. Thus, the reason for reducing the number of stations shown to two is purely for the sake of simplification and should not be considered as limiting in any sense.

In Figures 21 and 21A, electrical power is supplied to the system through the lines 111 to a suitable three-phase power circuit. The circuit breaker 112 and disconnect switch 113 protect the circuitry and serve to disconnect the power when the equipment is not in use. A car travel motor 114 which serves to drive the shuttle car in either direction is connected to the three-phase power circuit through overload relays 115 and 116 and relay contacts 135A, 135B and 135C, (the energizing relay for which will be later described). This car travel motor is physically located at the right-hand end of the housing adjacent the silo 20 and is adapted to drive the pulley 45 through the gear box 109. The car travel motor may also be connected to the three-phase power source for reverse operation through the electrical contacts 136A, 136B and 136C, (the operating relay for which will later be described).

A first discharge motor 77 (see also Figure 13) is connected through the three-phase power circuit through overload relays 118 and 119 and contacts 137A, 137B and 137C. This first discharge motor is the gate operating motor located above the stoker hopper 70 for the boiler 21. A second discharge motor 120 (which would be positioned over the stoker hopper 79 for the boiler 22) is connected to the three-phase power circuit through overload relays 121 and 122 and by means of contacts 138A, 138B and 138C.

A scale motor 123, which actually drives the belt feeder 2, is connected to the three-phase power source through overload relays 124 and 125 and through contacts 131A, 131B and 131C. The details of the driving arrangement between this scale motor and the belt feeder are not considered essential to the understanding of the present invention, but for further clarification, reference may be had to my co-pending application Serial No. 723,684, filed March 25, 1958, or to Patent No. 2,372,746.

A transformer 126 serves to reduce the supply voltage to a voltage suitable for the relay control circuits. The circuit for the secondary of the transformer 126 is protected by a fuse 127 and the other side of the secondary is grounded, as shown in Figure 21. A dividing line A—A is shown at the bottom of Figure 21 and at the top of Figure 21A. It should be understood that the left and right-hand lead lines continue from line A—A of Figure 21 into the corresponding lead lines shown on line A—A of Figure 21A.

A start-stop switch 128 is employed to place the stoker feeder into operation or it may be used to stop the same. A compensator switch 129, a gate switch 130 (for the weigh hopper gate), a scale motor relay 131, and normally closed contacts 124A and 125A are all in series with the start-stop switch 128. The compensator switch 119 is normally found in a batch-type coal scale and is merely employed for stopping the scale motor automatically when a predetermined weight of material is fed into the weigh hopper; the gate switch 130 is connected to the gate for the weigh hopper and is open when the gate is opened. Normally closed contact points 124A and 125A will open if excessive current passes through overload relays 124 and 125, respectively, in the circuit for the scale motor 123. Assuming that switches 129 and 130 are closed, energizing the circuit by pushing the "start" button on the start-stop switch 128 will energize the scale motor relay 131, closing the contacts 131A, 131B and 131C so as to start the scale motor 123; at the same time contacts 131D and 131E will also be closed, the former providing a shunt around the start-stop switch 128 so as to prevent the scale motor from stopping in the middle of a cycle of operation in the event that the "stop" button is pushed. Closing of the contacts 131E will cause actuation of the weigh hopper solenoid 132 which prevents the gate of the weigh hopper from being opened during the operation of the scale motor 123. If the solenoid 132 becomes deenergized, and if there is any coal in the weigh hopper, the gate 4 of the weigh hopper will open due to the weight of the coal upon it.

The normally open contacts 147A constitute a pair of contacts operated by a switch (not shown) located within the housing 25 adjacent the weigh hopper 3; this switch, which will be designated as the "home position switch," is actuated by the shuttle car 6 when the same returns to its starting or "home" position beneath the weigh hopper, and in this sense, the "home position switch" may be of the type shown in Figures 19 and 20, or it may be of a more simplified construction. At any event, closing of the contacts 147A will energize a "home" relay 133. Normally open contacts 131F and 133B of the scale motor relay 131 and the home relay 133, respectively, are in series, and when energized, actuate the "loaded" relay 134. The home relay 133 and the loaded relay 134 are control relays used in the functioning of this circuit and will be further described below. The loaded relay 134 is a latch-type relay which remains in the latched position after it has been energized; it is unlatched by a separate coil described below. Relay 134 has normally open contacts 134A in series with the solenoid 132, and contacts 134B, 134C, and 134D, later to be described.

Since the car travel motor 114 is a reversible motor, two separate connections must be provided, one for each direction of movement; for this purpose the relays designated as "car out" 135 and "car back" 136 are provided. When energized, relay 135 will cause closing of contacts 135A, 135B and 135C to cause the travel motor 114 to turn in such a direction as to result in movement of the shuttle car 6 away from its position beneath the weigh hopper toward one of the discharge stations. Similarly, energizing the coil 136 will result in closing of the contacts 136A, 136B and 136C which will cause the motor 114 to turn in such a manner as to move the shuttle car back toward its "home" position beneath the weigh hopper. If overload contacts 115A and 116A are open due to overheating of overload relays 115 or 116, neither of the relays 135 or 136 can be energized.

The first discharge motor 77 is operated by the first discharge relay 137 which is connected in series with overload contacts 118A and 119A of the overload relays 118 and 119, respectively. The second discharge motor 120 is operated by a second discharge relay 138 which is connected in series with overload contacts 121A and 122A of the overload relays 121 and 122, respectively.

For the purpose of the circuit diagram shown in Figures 21 and 21A, the two discharge stations illustrated in this combined circuit diagram will be represented by the compartments of the two stoker hoppers 70 and 79 corresponding to the locations of the two car-stopping switches 89 and 91, respectively (see Fig. 4). The car position switch 89 has two sets of contacts; normally closed contacts 89A are shown in series with the "car out" relay 135 and normally open contacts 89B are shown in series with the first discharge relay 137. The car position relay 91 has a set of normally closed contacts 91A in series with the "car out" relay 135 and a set of normally open contacts 91B in series with the second discharge relay 138.

An electrical counter 139 connected in parallel with the first discharge relay 137 records the number of times that this first discharge relay is energized and, hence, will indicate the total amount of coal discharged into the compartment corresponding to the location of the car-stopping switch 89. Another electrical counter 140 is similarly connected in parallel with the second discharge relay 138 for recording the total amount of coal delivered to the compartment corresponding to the location of the car-stopping switch 91. An unlatching coil 148 is provided for "unloading" the loaded relay 134.

Two paddle-operated switches of the type shown in Figure 11 are located in the compartments corresponding to the car-stopping switches 89 and 91; these paddle-operated switches (not shown individually) will be designated by the reference characters 141 and 142, respectively, and their normally open contacts 141A and 142A are shown as being in parallel with one another and in series with the "car out" relay 135. Also in series with the "car out" relay 135 are shown the normally open contacts 134B of the loaded relay and the normally closed contacts 137D and 138D of the first discharge relay and second discharge relay, respectively. The "car back" relay 136 is also connected in series with normally closed contacts 133C and 134C of the "home" relay and the "loaded" relay, respectively.

In the bottom portion of the circuit shown in Figure 21A, normally open contacts 134D of the "loaded" relay and normally closed contacts 135D of the "car out" relay are connected in series with the parallel circuit to the right thereof.

A pair of "discharge finish" switches are connected into this electrical circuit and these switches are responsive to the actuation of the gates 7 of the shuttle car 6 at the two discharge stations, respectively; these "discharge finish" switches are not specifically shown as such but will be generally designated as elements 145 and 146, respectively. The "discharge finish" switch 145 corresponding to the compartment located adjacent the switch 89 has a pair of normally open contacts 145A which serve to connect the unlatching coil 148 in parallel with the first discharge relay 137. The second "discharge finish" switch 146 has a pair of normally open contacts 146A which serve to connect the unlatching coil 148 in parallel with the second discharge relay 138.

Discharge finish switch 145, for example, is actuated by a cam on the shaft 76 such that the contacts 145A are momentarily closed by this cam arrangement as the shaft 76 nears the completion of one discharge cycle; the inertia of shaft 76 and its driving means will thereafter cause movement of the cam slightly beyond the switch 145 so as to open the contacts 145A.

The unlatching coil 148, referred to above, when energized, serves to return the "loaded" relay 134 to its unlatched condition.

In order to describe the operation of the stoker feeder in light of the electrical circuit shown in Figures 21 and 21A, the following conditions will be assumed:

(1) All power to the equipment is on and the start-stop switch 128 is in the "start" position;

(2) The car travel motor 114 has been energized by the "car back" relay 136 such that the shuttle car 6 is returning toward its "home" position following its discharge of a previous load of coal at one of the discharge stations;

(3) The weigh hopper 3 is completely filled with coal such that the compensator switch 129 is open and the relay 131 and scale motor 123 are deenergized.

Now as the shuttle car approaches the "home" position, the contacts 147A will be closed energizing the "home" relay 133 so as to open the contacts 133C de-energizing the "car back" relay 136 stopping the car travel motor 114. Thus, the shuttle car 6 will stop in position directly beneath the weigh hopper 3. Energizing the home relay 133 will cause the normally closed contacts 133A to open thus deenergizing the weigh hopper solenoid 132 and permitting the gate 4 of the weigh hopper 3 to open. The weigh hopper 3 will discharge its load into the shuttle car 6 and thereafter the gate 4, being counterweighted, will return to its closed position so as to close the switch 130. During the dumping of the coal from the weigh hopper 3, the weigh levers (not shown) upon which the weigh hopper is suspended, will pivot about their fulcra so as to close the compensator switch 129. Thus, the scale motor relay 131 will be energized closing contacts 131A, 131B and 131C in the circuit to the scale motor 123 as well as contacts 131D, 131E and 131F. Closing of the contacts 131D will prevent stopping of the scale motor 123 even if the "stop" button is depressed. Closing of the contacts 131E will prevent the weigh hopper solenoid 132 from becoming deenergized. Closing of the contacts 131F which are in series with the now closed contacts 133B of the "home" relay 133 will actuate the "loaded" relay 134.

Actuation of the relay 134 will cause closing of contacts 134A, 134B and 134D, and the opening of contacts 134C; since this relay 134 is of the latch type, its contacts will remain in the latter-described condition until the unlatching coil 148 becomes energized to return the relay 134 to its unloaded condition. Thus, if the scale motor 123 completes its operation of filling the weigh hopper 3 before the shuttle car 6 is required to move away from the "home" position, the contacts 134A will still remain closed to prevent the weigh hopper from discharging its load into the shuttle car 6 until after the latter has made a trip out, has discharged, and has returned to the "home" position.

The scale motor 123 will continue to operate until a predetermined weight of coal has been delivered by the belt feeder 2 into the weigh hopper 3; when this condition is reached, the weigh lever on which the scale hopper is suspended will actuate the compensator switch 129 causing the same to open so as to stop the scale motor 123.

It will be assumed, now, that the level of the coal in the compartment corresponding to the switch 89 is such that paddle-operated switch 141 is energized and that the contacts 141A have become closed. Thus, since the loaded relay 134 has been energized and has not been unloaded, contacts 134B and 141A will be closed and the circuit through the "car out" relay 135 will be completed. Thus, contacts 135A, 135B and 135C will be closed causing the travel motor 114 to be energized whereby the shuttle car 6 will be moved outwardly toward the station adjacent the switch 89. The car will continue to move until the cam plate 85 on the car contacts the roller 96 of the switch 89. When this latter condition results, the contacts 89A will be opened, the relay 135 will be deenergized and the motor 114 will be shut off, thus causing the shuttle car 6 to be positioned directly over the compartment corresponding to the switch 89.

At this time, contacts 89B will be closed. Contacts 134D will also be closed since the loaded relay 134 has not been "unloaded," and, since the relay 135 has been deenergized, the contacts 135D are also closed. Thus, the first discharge relay 137 will be energized so as to close contacts 137A, 137B and 137C, thus causing operation of the first discharge motor 77.

Actuation of the motor 77 will cause rotation of the shaft 76 and a consequent opening of the gates 7, 7, as described previously in relation to Figure 12. The electrical arrangement with regard to the motor 77 (as well as regards dumping motor 120) are such that the shaft 76 makes one complete revolution, thus returning the rails 71 and 72 to the same position shown in Figure 12, at the start of the opening cycle. For this purpose, there is a limit switch which is actuated by a cam on the shaft 76 and which serves to stop the first discharge motor 77 in such a manner that the shaft 76 will make a single revolution; this switch is generally designated by the reference numeral 145 in Figure 13 and has been previously described as the "discharge finish" switch having the normally open contacts 145A.

Each time that the first discharge relay 137 is energized, the counter 139 will be energized so as to indicate the total number of dumps at the station corresponding to switch 89.

As the shaft 76 rotates towards the completion of the discharge cycle, contacts 145A will be closed so as to energize the unlatching coil 148, and this unlatching coil, by virtue of its mechanical connection with the "loaded" relay 134, will return the "loaded" relay 134 to its "unloaded" condition so as to open contacts 134A, 134B and 134D and to close contacts 134C. The opening of contacts 134A will permit the deenergization of the solenoid 132 when the car 6 returns to the "home" position; opening the contacts 134B will prevent the "car out" relay 135 from being energized as the car moves away from the position corresponding to the switch 89, even if, thereafter, the contacts 141A should still be closed. Closing the contacts 134C will cause the "car back" relay 136 to become energized so as to actuate the car travel motor 114 in such a way as to return the shuttle car 6 to its "home" position. Opening of the contact points 134D will prevent the circuit shown at the bottom of Figure 21A from becoming energized.

As shown in Figure 21A, if both pairs of contacts 141A and 142A are closed simultaneously, representing a condition that calls for the supplying of additional coal to the compartments corresponding to the positions of switches 89 and 91, respectively, it should be noted that the more remote discharge station will take precedence, i.e., the station corresponding to the location of the switch 91. For example, if both contact points 141A and 142A are closed, the movement of the shuttle car 6 past the switch 89 with the consequent opening of the contact points 89A will not result in a deenergization of the "car out" switch 135, since the circuit will be still complete through the contacts 142A and 91A, and the car will not be stopped until the contact points 91A are opened. Thus, if both stations are calling for additional coal, no coal will be supplied to the station at switch 89 until the requirements of the station at 91 are completely satisfied. However, if the shuttle car 6 is located at the station corresponding to switch 89 and is discharging a load at the time the station corresponding to switch 91 calls for additional coal, the contact points 137D would be open so as to prevent the "car out" relay 135 from being energized.

After the shuttle car completes discharging its load at any one of the various discharge stations, the "car back" relay will be energized, the car will be returned to the "home" position and the sequence of operations described above will be repeated.

Although, as indicated heretofore, the circuit shown in Figures 21 and 21A has been described with particular reference to the operation of the stoker feeder in connection with two discharge stations, it should be understood that a similar (but more complicated) circuit could be employed in connection with a greater number of discharge stations.

Figures 22 and 23 of the drawings show an over-all coal-handling system employing the stoker feeder, i.e., the shuttle car and the coal weighing scale, in connection with two separate boilers and an outside storage pile of coal. This particular arrangement shows a coal (railroad) car 200 which discharges coal to a track hopper 201. From the hopper, the coal passes through a track hopper valve 202 (the use of which is optional) to a belt conveyer 203 that discharges the coal to a bucket elevator 204. The bucket elevator 204 elevates the coal to a surge hopper 205 which could be a coal silo of considerable capacity, or it could be a small hopper capable of containing a few hundred pounds to several tons. A coal level switch (not shown), such as has been disclosed in connection with Figure 11 of the drawings, in the surge hopper, can be used to start and stop the bucket elevator automatically; otherwise, the bucket elevator can be started and stopped simultaneously with the motor for the coal scale. Beneath the surge hopper is a coal weighing system 206 which is similar to the coal weighing system employed heretofore in connection with the present invention. The coal scale 206 discharges into the automatic stoker feeder, i.e., a shuttle car, located within the horizontal housing 207. The left-hand portion of this housing 207 operates substantially in the same manner as previously described for the purpose of feeding coal automatically to the two boilers 208 and 209.

The stoker hoppers 210 and 211 associated with the two boilers 208 and 209, respectively, are shown as being of the "conical" type which, as it is well known, are inherently non-segregating in character. In this respect, it should be mentioned here that a "conical" hopper or distributor having an opening, measured in a direction parallel to the boiler front, equal in length to the discharge opening of the shuttle car could be substituted for the divided stoker hopper heretofore described, and thus the stoker hoppers designated at 70 and 79 might be replaced by "conical" distributors meeting the above mentioned requirements. Generally, however, "conical" distributors require more head room, and this fact may be of importance in determining the type of hopper or distributor to be employed.

In the right-hand portion of the housing 207, when neither of the boilers 208 or 209 is calling for coal, the stoker feeder, i.e., the shuttle car, is permitted to travel to the extreme right-hand end where, by means of a discharge procedure similar to that described heretofore, the car can discharge its load into an outside storage pile 212. When needed, coal may be taken from the pile through the hopper 213 and valve 214 onto the conveyer belt 203 and into the system heretofore described. As shown, the feeder may be the same as the feeder which takes the coal from the track hopper or, if desired, a second feeder may be used in other arrangements.

Although this drawing shows the housing arranged in a straight line, it is not necessary that it be so arranged because, as indicated heretofore, the shuttle car can go around corners or upwardly or downwardly.

It is contemplated that the above coal-handling system will be made entirely automatic and dust-tight, particularly insofar as the interior operation is concerned. As the railroad car is unloaded, the coal may be fed to either of the boilers 208 or 209 or to the outside storage pile 212. The control system can be so devised that the boilers only will be fed, or that the outside storage pile only will be fed, or that both may be fed in any desired sequence.

A counter, or a series of counters, may be employed in connection with the coal scale to indicate the total number of loads of coal delivered to, or by, the weigh hopper; also, one or more of these counters may be operated in connection with the source of supply of the coal or with respect to the points of discharge. In this regard, the coal scale can be so connected that it will give the following weights:

(1) The total weight of coal taken from the railroad car;

(2) The total weight of coal delivered to each boiler, or the total weight of coal delivered to each compartment of each stoker hopper;

(3) The total weight of coal delivered to the outside storage pile; and (4) The total weight of coal reclaimed from the outside storage pile.

Thus, one coal scale can be employed to keep a complete inventory of the coal, wherever it may be.

In the system shown in Figures 22 and 23, it is not necessary that the shuttle car be employed to take coal from the coal scale to the outside storage pile, but it must be employed between the coal scale and the individual boilers because of segregation reasons. In this regard, the right-hand portion of the housing 207, may be replaced by a separate conveyer which may result in an initial savings in equipment costs, and it may add a certain amount of flexibility in the arrangement of the plant, but, on the other hand, it does introduce another piece of equipment.

In the system of the present invention, the shuttle car is designed to carry separate loads, each of which is equal to the predetermined weight of coal delivered by the weigh hopper. Also, this system could be modified in such a manner that the shuttle car would take a predetermined number of equal loads from the weigh hopper. Therefore, it is possible to determine accurately the amount of coal going to each boiler or to the storage pile. Also, it is possible to determine the amount of coal delivered at one time from a railroad car as well as to determine the total amount of coal on hand at a given time. If the amount of coal consumed by each boiler can be accurately determined, as in the case of the present invention, it is possible to compare the efficiencies of the various boilers. Also, if an accurate tabulation of the coal consumption in a particular boiler is kept for a period of time, it is possible to determine, by observing a variation in the coal consumption, whether or not the efficiency of this particular boiler is decreasing, and whether or not, in light of this observation, it is necessary to shut down the boiler for a period of time for the purpose of cleaning the same.

Thus, in the case of the coal handling system described in relation to Figures 22 and 23, there would be one counter for each of the boilers shown (although in relation to the prior embodiment there would be one counter for each of the compartments of the stoker hoppers for the boilers); there would be one counter for the coal going to the storage pile; there would be another counter for the coal taken from the storage pile, and there would be another counter for the coal taken away from the coal scale. Suitable selector switches would be provided in the electrical circuit so that the proper counters would come into play at the proper time. Finally, since it is possible to obtain counters that both add and subtract, the amount of coal in the storage pile at one given time could be obtained directly on a single counter, if desired.

Other and further modifications of the present invention, apart from those shown or suggested herein, may be made within the spirit and scope of this invention.

What is claimed is:

1. A material handling system for transferring solid particulate material having a random mixture of different sized particles from a point of supply to a plurality of points of use comprising a movable receptacle, vertical side and end walls defining in horizontal cross section a substantially rectangular space in said receptacle, a closure means at the bottom of said receptacle for providing an opening extending between said end walls and parallel to said side walls, whereby said receptacle is adapted to discharge a stream of solid material from said opening parallel to said side walls and equal in horizontal width in said parallel direction to the length between said end walls, a single means for feeding predetermined weighed quantities of said material from a supply of said material to the upper end of said receptacle, said feeding means feeding a stream of solid material parallel to, and equal in horizontal width in said parallel direction to the length of the opening at the bottom of said receptacle, a substantially upright chute positioned adjacent each said point of use, said chute defining a downwardly directed passageway leading to said point of use and having a pair of spaced parallel side walls separated from one another at a distance approximately equal to the distance between the end walls of said movable receptacle, and means for moving said movable receptacle from said feeding means to a position above said chute such that the end walls of said receptacle are substantially coplanar with respect to the side walls of said chute, and means for opening the closure means on said receptacle so as to discharge said solid material from the opening in said receptacle into said chute.

2. A non-segregating stoker feeder for a furnace of the type having a horizontally traveling grate comprising a movable receptacle having a pair of spaced vertical side walls and a pair of spaced vertical ends walls, a closure means at the bottom of said receptacle, said closure means being movable so as to provide an opening extending between said end walls and being parallel to said side walls, whereby said receptacle is adapted to discharge a stream of solid material from said opening parallel to said side walls and equal in horizontal width in said parallel direction to the length between said end walls, a weigh hopper supported at a point remote from said furnace, means for supplying predetermined weights of said coal to said weigh hopper, a closure at the bottom of said weigh hopper, said closure on said weigh hopper being movable to a position so as to define a longitudinal opening substantially equal in length to the opening at the bottom of said movable receptacle, said opening in said weigh hopper being substantially parallel to the opening in said receptacle when said receptacle is positioned beneath said weigh hopper, a stoker hopper arranged in a substantially vertical position and having an opening at the bottom end thereof communicating with the horizontally traveling grate of said furnace, said bottom opening being substantially equal in over-all length to the width of said movable grate, said stoker hopper having an opening at the upper end thereof which is substantially equal in horizontal length, measured parallel to the front of the furnace, to the length of the opening in said movable receptacle, means responsive to the level of coal in said stoker hopper for moving said movable receptacle from beneath said weigh hopper to a position directly above the upper opening of said stoker hopper, means responsive to the movement of said movable receptacle to said position over said stoker hopper for opening the closure means at the bottom of said receptacle so as to discharge said coal into said stoker hopper, the opening in said receptacle being parallel to the aforementioned length of the upper opening of said stoker hopper, and means responsive to the discharge of material from said receptacle into said stoker hopper for moving said receptacle back to its original position directly beneath said weigh hopper.

3. A material handling system for transferring solid particulate material having a random mixture of different sized particles from a point of supply to a point of use comprising a movable receptacle, vertical side and end walls defining in horizontal cross section a substantially rectangular space in said receptacle, a closure means at the bottom of said receptacle for providing an opening extending between said end walls and parallel to said side walls, means adjacent said supply point for feeding predetermined quantities of said material from a supply of said material to the upper end of said receptacle, said feeding means being provided with an opening substantially equal in length to the length of the opening at the bottom of said receptacle, said opening in said feeding means being substantially parallel to the opening in said receptacle when said receptacle is positioned relative to said feeding means for receiving said supply of material therefrom, a substantially upright chute positioned adjacent said point of use, said chute defining a downwardly directed passageway leading to said point of use and having a pair of spaced, parallel side walls separated from one another at a distance approximately equal to the distance between the end walls of said movable receptacle, and means for moving said movable receptacle from said feeding means to a position above said chute such that the end walls of said receptacle are substantially coplanar with respect to the side walls of said chute, and means for opening the closure means on said receptacle so as to discharge said solid material from the opening in said receptacle into said chute.

4. A non-segregating stoker feeder for a furnace of the type having a horizontally traveling grate comprising a movable receptacle having a pair of spaced vertical side walls and a pair of spaced vertical end walls, a closure means at the bottom of said receptacle, said closure means being movable so as to provide an opening extending between said end walls and being parallel to said side walls, a weigh hopper supported at a point remote from said furnace, means for supplying predetermined weights of said coal to said weigh hopper, a closure at the bottom of said weigh hopper, said closure on said weigh hopper being movable to define a longitudinal opening substantially equal in length to the opening at the bottom of said movable receptacle, said opening in said weigh hopper being substantially parallel to the opening in said receptacle when said receptacle is positioned beneath said weigh hopper, a stoker hopper arranged in a substantially vertical position and having an opening at the bottom end thereof communicating with the horizontally traveling grate of said furnace, said bottom opening of said stoker hopper being substantially equal in over-all length to the width of said movable grate and being substantially perpendicular to the direction of movement of said grate, said stoker hopper having at least one vertical partition arranged substantially parallel to the direction of movement of said movable grate and dividing said stoker hopper into a plurality of compartments each of which, in a direction parallel to the front of said furnace, is substantially equal in horizontal length to the length of the opening in said movable receptacle, a coal-level sensing device in each compartment of said stoker hopper for sensing the level of coal in each said compartment, means responsive to the actuation of any of said level sensing means, when the coal in the corresponding compartment falls below a predetermined level, for moving said movable receptacle from beneath said weigh hopper to a position directly above said corresponding compartment, means responsive to the movement of said movable receptacle to said position over said corresponding compartment for opening the closure means at the bottom of said receptacle so as to discharge said coal from said receptacle into said corresponding compartment, the opening in said receptacle at the time of discharge being parallel to the aforementioned length of said compartment, means responsive to the discharge of material from said receptacle into said corresponding compartment for moving said receptacle back to its original position directly beneath said weigh hopper, and means responsive to the movement of said receptacle to said position beneath said weigh hopper for discharging said predetermined weight of coal from said weigh hopper into said movable receptacle.

5. A material handling system for transferring solid particulate material having a random mixture of different sized particles from a point of supply to a plurality of points of use, comprising a dispensing means located adjacent said supply for discharging predetermined weights of said solid material, a movable receptacle movable from a position directly beneath said dispensing means to a position over any one of said points of use, said movable receptacle having an opening at the bottom thereof of a predetermined length, means responsive to the positioning of said movable receptacle beneath said dispensing means for discharging a stream of solid material from said dispensing means in a direction parallel to said predetermined length of said receptacle opening, said stream having a width measured in said parallel direction equal to said predetermined length, means for moving said movable receptacle selectively to one of said points of use, each of said points of use having a hopper opening equal in horizontal length to said predetermined length, means responsive to the positioning of said movable receptacle over said one of said points of use for discharging a stream of solid material therefrom parallel to the length of said receptacle opening and parallel to the aforementioned length of the corresponding hopper opening, and means responsive to the discharge of material from said receptacle for returning said receptacle to its initial position beneath said dispensing means.

6. A material handling system for transferring solid particulate material having a random mixture of different sized particles from a point of supply to a plurality of points of use, comprising a dispensing means located adjacent said supply for discharging predetermined weights of said solid material, a means for feeding predetermined weights of said material from said supply to said dispensing means, a movable receptacle movable from a position directly beneath said dispensing means to a position over any one of said points of use, said movable receptacle having an opening at the bottom thereof of a predetermined length, means responsive to the positioning of said movable receptacle beneath said dispensing means for discharging a stream of solid material from said dispensing means in a direction parallel to said predetermined length of said receptacle opening, said stream having a width measured in said parallel direction equal to said predetermined length, means responsive to the discharging of said material from said dispensing means into said receptacle for actuating said feeding means, means for moving said movable receptacle selectively to one of said points of use, each of said points of use having a hopper opening equal in horizontal length to said predetermined length, means responsive to the positioning of said movable receptacle over said one of said points of use for discharging a stream of solid material therefrom parallel to the length of said receptacle opening and parallel to the aforementioned length of the corresponding hopper opening, and means responsive to the discharge of material from said receptacle for returning said receptacle to its initial position beneath said dispensing means.

7. A material handling system for transferring solid particulate material having a random mixture of different sized particles from a point of supply to a plurality of points of use, comprising a dispensing means located adjacent said supply for discharging predetermined weights of said solid material, means for feeding predetermined weights of material from said supply to said dispensing means, a movable receptacle movable from a position directly beneath said dispensing means to a position over any one of said points of use, said movable receptacle having an opening at the bottom thereof of a predetermined length, means responsive to the positioning of said movable receptacle beneath said dispensing means for discharging a stream of solid material from said dispensing means in a direction parallel to said predetermined length of said receptacle opening, said stream having a width measured in said parallel direction equal to said predetermined length, means for actuating said feeding means in response to the discharge of said predetermined weight of material from said dispensing means into said receptacle, means responsive to the consumption of said material at each one of said points of use for moving said movable receptacle selectively to said one of said points of use, each of said points of use having a hopper opening equal in horizontal length to said predetermined length, means responsive to the positioning of said movable receptacle over said one of said points of use for discharging a stream of solid material therefrom parallel to the length of said receptacle opening and parallel to the aforementioned length of the corresponding hopper opening, and means responsive to the discharge of material from said receptacle for returning said receptacle to its initial position beneath said dispensing means.

8. A material handling system for transferring solid particulate material having a random mixture of different sized particles from a point of supply to a plurality of points of use comprising a movable receptacle, vertical side and end walls defining in horizontal cross section a substantially rectangular space in said receptacle, a closure means at the bottom of said receptacle for providing an opening extending between said end walls and parallel to said side walls, whereby said receptacle is adapted to discharge a stream of solid material from said opening parallel to said side walls and equal in horizontal width in said parallel direction to the length between said end walls, a single means for dispensing predetermined weighed quantities of said material to the upper end of said receptacle, means for feeding predetermined weights of material from said supply to said dispensing means, means responsive to the positioning of said receptacle beneath said dispensing means for actuating said dispensing means and for discharging therefrom into said receptacle a stream of solid material parallel to, and equal in horizontal width in said parallel direction to the length of the opening at the bottom of said receptacle, means for actuating said feeding means in response to the discharge of said predetermined weight of material from said dispensing means into said receptacle, a substantially upright chute positioned adjacent each said point of use, said chute defining a downwardly directed passageway leading to said point of use and having a pair of spaced parallel side walls separated from one another at a distance approximately equal to the distance between the end walls of said movable receptacle, means responsive to the consumption of said material at each one of said points of use for moving said movable receptacle from said feeding means to a position above the corresponding chute such that the end walls of said receptacle are substantially coplanar with respect to the side walls of said chute, and means responsive to the positioning of said receptacle over said chute for opening the closure means on said receptacle so as to discharge said solid material from the opening in said receptacle into said chute.

9. A non-segregating stoker feeder for a furnace of the type having a horizontally traveling grate comprising a movable receptacle having a pair of spaced vertical side walls and a pair of spaced vertical end walls, a closure means at the bottom of said receptacle, said closure means being movable so as to provide an opening extending between said end walls and being parallel to said side walls, whereby said receptacle is adapted to discharge a stream of solid material from said opening parallel to said side walls and equal in horizontal width in said parallel direction to the length between said end walls, a weigh hopper supported at a point remote from said furnace, means for supplying predetermined weights of said coal to said weigh hopper, a closure at the bottom of said weigh hopper, said closure on said weigh hopper being movable to a position so as to define a longitudinal opening substantially equal in length to the opening at the bottom of said movable receptacle, said opening in said weigh hopper being substantially parallel to the opening in said receptacle when said receptacle is positioned beneath said weigh hopper, a stoker hopper arranged in a substantially vertical position and having an opening at the bottom end thereof communicating with the horizontally traveling grate of said furnace, said bottom opening being substantially equal in over-all length to the width of said movable grate, said stoker hopper having an opening at the upper end thereof which is substantially equal in horizontal length, measured parallel to the front of the furnace, to the length of the opening in said movable reecptacle, means responsive to the level of coal in said stoker hopper for moving said movable receptacle from beneath said weigh hopper to a position directly above the upper opening of said stoker hopper, means responsive to the movement of said movable receptacle to said position over said stoker hopper for opening the closure means at the bottom of said receptacle so as to discharge said coal into said stoker hopper, the opening in said receptacle being parallel to the aforementioned length of the upper opening of said stoker hopper, means responsive to the discharge of material from said receptacle into said stoker hopper for moving said receptacle back to its original position directly beneath said weigh hopper, means responsive to the movement of said receptacle back to said original position for actuating said weigh hopper to cause discharge of said predetermined weight of material from said weigh hopper into said receptacle, and means responsive to the discharge of material from said weigh hopper into said receptacle for actuating said supplying means for supplying a predetermined weight of coal to said weigh hopper.

10. A non-segregating stoker feeder for a furnace of the type having a horizontally traveling grate comprising a movable receptacle having a pair of spaced vertical side walls and a pair of spaced vertical end walls, a closure means at the bottom of said receptacle, said closure means being movable so as to provide an opening extending between said end walls and being parallel to said side walls, a weigh hopper supported at a point remote from said furnace, means for supplying predetermined weights of said coal to said weigh hopper, a closure at the bottom of said weigh hopper, said closure on said weigh hopper being movable to define a longitudinal opening substantially equal in length to the opening at the bottom of said movable receptacle, said opening in said weigh hopper being substantially parallel to the opening in said receptacle when said receptacle is positioned beneath said weigh hopper, a stoker hopper arranged in a substantially vertical position and having an opening at the bottom end thereof communicating with the horizontally traveling grate of said furnace, said bottom opening of said stoker hopper being substantially equal in over-all length to the width of said movable grate and being substantially perpendicular to the direction of movement of said grate, said stoker hopper having at least one vertical partition arranged substantially parallel to the direction of movement of said movable grate and dividing said stoker hopper into a plurality of compartments each of which, in a direction parallel to the front of said furnace, is substantially equal in horizontal length to the length of the opening in said movable receptacle, a coal-level sensing device in each compartment of said stoker hopper for sensing the level of coal in each said compartment, means responsive to the actuation of any of said level sensing means, when the coal in the corresponding compartment falls below a predetermined level, for moving said movable receptacle from beneath said weigh hopper to a position directly above said corresponding compartment, means responsive to the movement of said movable receptacle to said position over said corresponding compartment for opening the closure means at the bottom of said receptacle so as to discharge said coal from said receptacle into said corresponding compartment, the opening in said receptacle into said corresponding compartment, the opening in said receptacle at the time of discharge being parallel to the aforementioned length of said compartment, means responsive to the discharge of material from said receptacle into said corresponding compartment for moving said receptacle back to its original position directly beneath said weigh hopper, means responsive to the movement of said receptacle to said position beneath said weigh hopper for discharging said predetermined weight of coal from said weigh hopper into said movable receptacle, and means responsive to the discharge of material from said weigh hopper into said receptacle for actuating said supplying means for supplying a predetermined weight of coal to said weigh hopper.

11. A material handling system for transferring solid particulate material having a random mixture of different sized particles from an original source of supply to a plurality of points of use and to at least one point of storage, comprising a dispensing means for discharging predetermined weights of said solid material, means for feeding predetermined weights of said material to said dispensing means selectively from said original source of supply and from at least one point of storage, a movable receptacle movable from a position directly beneath said dispensing means to a position over any one of said points of use and to a position over at least one point of storage, said movable receptacle having an opening at the bottom thereof of a predetermined length, means responsive to the positioning of said movable receptacle beneath said dispensing means for discharging a stream of solid material from said dispensing means in a direction parallel to said predetermined length of said receptacle opening, said stream having a width measured in said parallel direction equal to said predetermined length, means responsive to the discharging of said material from said dispensing means into said receptacle for actuating said feeding means, means for moving said movable receptacle selectively to any one of said points of use and to at least one point of storage, each of said points of use having a hopper opening equal in horizontal length to said predetermined length, means responsive to the positioning of said movable receptacle over said one of said points of use and over each point of storage for discharging a stream of solid material therefrom, said stream at each point of use being parallel to the length of said receptacle opening and parallel to the aforementioned length of the corresponding hopper opening, and means responsive to the discharge of material from said receptacle for returning said receptacle to its initial position beneath said dispensing means.

12. A material handling system for transferring solid particulate material having a random mixture of different sized particles from an original source of supply to a plurality of points of use and to at least one point of storage, comprising a dispensing means for discharging predetermined weights of said solid material, means for feeding predetermined weights of said material to said dispensing means selectively from said original source of supply and from one of said points of storage, a movable receptacle movable from a position directly beneath said dispensing means to a position over any one of said points of use and to a position over any one of said points of storage, said movable receptacle having an opening at the bottom thereof of a predetermined length, means responsive to the positioning of said movable receptacle beneath said dispensing means for discharging a stream of solid material from said dispensing means in a direction parallel to said predetermined length of said receptacle opening, said stream having a width measured in said parallel direction equal to said predetermined length, means responsive to the discharging of said material from said dispensing means into said receptacle for actuating said feeding means, means responsive to the consumption of said material at said one of said points of use for moving said movable receptacle selectively to said one of said points of use, each of said points of use having a hopper opening equal in horizontal length to said predetermined length, means responsive to the positioning of said movable receptacle over said one of said points of use for discharging a stream of solid material therefrom parallel to the length of said receptacle opening and parallel to the aforementioned length of the corresponding hopper opening, means responsive to a condition where none of said points of use requires additional material for moving said receptacle to one of said points of storage and for discharging a predetermined weight of material from said receptacle at said point of storage, and means responsive to the discharge of material from said receptacle for returning said receptacle to its initial position beneath said dispensing means.

13. The improvement as set forth in claim 12 including an electrical counter associated with each said point of use and each point of storage for indicating the total quantity of material discharged by said dispensing means with relation to each point of discharge for said movable receptacle.

14. A material handling system for transferring solid particulate material having a random mixture of different sized particles from a point of supply to a point of use comprising a movable receptacle, a vertical side and end walls defining in horizontal cross section a substantially rectangular space in said receptacle, a closure means at the bottom of said receptacle for providing an opening extending between said end walls and parallel to said side walls, means adjacent said supply point for feeding predetermined quantities of said material from a supply of said material to the upper end of said receptacle, said feeding means being provided with an opening substantially equal in length to the length of the opening at the bottom of said receptacle, said opening in said feeding means being substantially parallel to the opening in said receptacle when said receptacle is positioned relative to said feeding means for receiving said supply of material therefrom, a substantially upright chute positioned adjacent said point of use, said chute defining a downwardly directed passageway leading to said point of use and having a pair of spaced, parallel side walls separated from one another at a distance approximately equal to the distance between the end walls of said movable receptacle, and means for moving said movable receptacle from said feeding means to a position above said chute such that the end walls of said receptacle are substantially coplanar with respect to the side walls of said chute, means for opening the closure means on said receptacle so as to discharge said solid material from the opening in said receptacle into said chute, and an enclosed, dust-tight housing communicating with said feeding means and with said chute and providing a passageway for the travel of said movable receptacle from said feeding means to said chute.

15. A material handling system for transferring solid particulate material having a random mixture of different sized particles from a point of supply to a plurality of points of use, comprising a dispensing means located adjacent said supply for discharging predetermined weights of said solid material, means for feeding predetermined weights of material from said supply to said dispensing means, a movable receptacle movable from a position directly beneath said dispensing means to a position over any one of said points of use, said movable receptacle having an opening at the bottom thereof of a predetermined length, means responsive to the positioning of said movable receptacle beneath said dispensing means for discharging a stream of solid material from said dispensing means in a direction parallel to said predetermined length of said receptacle opening, said stream having a width measured in said parallel direction equal to said predetermined length, means for actuating said feeding means in response to the discharge of said predetermined weight of material from said dispensing means into said receptacle, means responsive to the consumption of said material at each one of said points of use for moving said movable receptacle selectively to said one of said points of use, each of said points of use having a hopper opening equal in horizontal length to said predetermined length, means responsive to the positioning of said movable receptacle over said one of said points of use for discharging a stream of solid material therefrom parallel to the length of said receptacle opening and parallel to the aforementioned length of the corresponding hopper opening, means responsive to the discharge of material from said receptacle for returning said receptacle to its initial position beneath said dispensing means, and an elongated and enclosed tunnel communicating with the discharge opening for said dispensing means and with each of the hoppers at said points of use and providing a dust-tight passageway for the travel of said movable receptacle from said dispensing means to each hopper.

16. A non-segregating stoker feeder for a plurality of furnaces of the type having a horizontally traveling grate comprising a movable receptacle having a pair of spaced vertical side walls and a pair of spaced vertical end walls, a closure means at the bottom of said receptacle, said closure means being movable so as to provide an opening extending between said end walls and being parallel to said side walls, whereby said receptacle is adapted to discharge a stream of solid material from said opening parallel to said side walls and equal in horizontal width in said parallel direction to the length between said end walls, a weigh hopper supported at a point remote from said furnace, means for supplying predetermined weights of said coal to said weigh hopper, a closure at the bottom of said weigh hopper, said closure on said weigh hopper being movable to a position so as to define a longitudinal opening substantially equal in length to the opening at the bottom of said movable receptacle, said opening in said weigh hopper being substantially parallel to the opening in said receptacle when said receptacle is positioned beneath said weigh hopper, a plurality of stoker hoppers each arranged in a substantially vertical position and having an opening at the bottom end thereof communicating with the horizontally traveling grate of the associated furnace, said bottom opening being substantially equal in over-all length to the width of said movable grate, each said stoker hopper having an opening at the upper end thereof which is substantially equal in horizontal length, measured parallel to the front of its associated furnace, to the length of the opening in said movable receptacle, means responsive to the level of coal in each said stoker hopper for moving said movable receptacle from beneath said weigh hopper to a position directly above the upper opening of said stoker hopper, means responsive to the movement of said movable receptacle to said position over said stoker hopper for opening the closure means at the bottom of said receptacle so as to discharge said coal into said stoker hopper, the opening in said receptacle being parallel to the aforementioned length of the upper opening of said stoker hopper, means responsive to the discharge of material from said receptacle into said stoker hopper for moving said receptacle back to its original position directly beneath said weigh hopper, means responsive to the movement of said receptacle back to said original position for actuating said weigh hopper to cause discharge of said predetermined weight of material from said weigh hopper into said receptacle, means responsive to the discharge of material from said weigh hopper into said receptacle for actuating said supplying means for supplying a predetermined weight of coal to said weigh hopper, and a longitudinally extending tunnel communicating with the closure for said weigh hopper and with the upper opening of each said stoker hopper and providing a dust-tight enclosed passageway for the travel of said movable receptacle to and from said position beneath said weigh hopper to and from each position directly above the upper opening of each said stoker hopper.

No references cited.